US012516895B2

(12) United States Patent
Metropoulos

(10) Patent No.: US 12,516,895 B2
(45) Date of Patent: Jan. 6, 2026

(54) APPARATUS AND METHODS FOR SELF-CLEANING AND MAINTAINING HVAC HEAT TRANSFER COILS

(71) Applicant: BLUE BOX AIR, LLC, Dallas, TX (US)

(72) Inventor: James Metropoulos, Dallas, TX (US)

(73) Assignee: BLUE BOX AIR, LLC, Dallas, TX (US)

( * ) Notice: Subject to any disclaimer, the term of this patent is extended or adjusted under 35 U.S.C. 154(b) by 344 days.

(21) Appl. No.: 18/109,678

(22) Filed: Feb. 14, 2023

(65) Prior Publication Data
US 2023/0258421 A1 Aug. 17, 2023

Related U.S. Application Data

(60) Provisional application No. 63/310,734, filed on Feb. 16, 2022.

(51) Int. Cl.
*B08B 3/02* (2006.01)
*B08B 3/00* (2006.01)
(Continued)

(52) U.S. Cl.
CPC ............. *F28G 9/00* (2013.01); *B08B 3/003* (2013.01); *B08B 3/02* (2013.01); *B08B 3/08* (2013.01);
(Continued)

(58) Field of Classification Search
CPC .. F28G 9/00; B08B 3/003; B08B 3/02; B08B 3/08; B08B 9/023; B08B 13/00; B08B 2209/02
(Continued)

(56) References Cited

U.S. PATENT DOCUMENTS 3,037,887 A 6/1962 Brenner et al.
3,244,223 A 4/1966 Edwards
(Continued)

FOREIGN PATENT DOCUMENTS

CN 102615070 A 8/2012
CN 202547489 U 11/2012
(Continued)

OTHER PUBLICATIONS

International Search Report and Written Opinion received for PCT Patent Application No. PCT/US23/062729, mailed on Jun. 8, 2023, 11 pages.
(Continued)

*Primary Examiner* — Tinsae B Ayalew
(74) *Attorney, Agent, or Firm* — Workman Nydegger

(57) ABSTRACT

Apparatus and system for self-cleaning a heat transfer coil of an HVAC system includes a foam or spray generator, one or more manifolds, one or more couplers, and a controller. The foam or spray generator is configured to generate foam or spray. Each manifold includes one or more emitters. The couplers are configured to couple the manifolds onto the heat transfer coil of the HVAC system, such that the emitters are configured to emit the foam or spray onto a side of the heat transfer coil. The controller is configured to cause the foam or spray generator to generate the foam or spray and cause the emitters to emit the foam or spray when a fan is running, such that the foam or spray is caused to flow through the heat transfer coil to clean debris off or apply a treatment to the heat transfer coil.

20 Claims, 14 Drawing Sheets

(51) Int. Cl.
  *B08B 3/08*   (2006.01)
  *B08B 9/023*  (2006.01)
  *B08B 13/00*  (2006.01)
  *F28G 9/00*   (2006.01)

(52) U.S. Cl.
  CPC ............ *B08B 9/023* (2013.01); *B08B 13/00* (2013.01); *B08B 2209/02* (2013.01)

(58) Field of Classification Search
  USPC ...................................................... 134/57 R
  See application file for complete search history.

(56) References Cited

U.S. PATENT DOCUMENTS

| | | | |
|---|---|---|---|
| 3,739,556 | A  | 6/1973  | Waters |
| 4,332,292 | A  | 6/1982  | Garberick |
| 4,676,305 | A  | 6/1987  | Doty |
| 5,509,972 | A  | 4/1996  | Akazawa et al. |
| 5,529,972 | A  | 6/1996  | Ramello et al. |
| 5,737,937 | A  | 4/1998  | Akazawa |
| 5,911,742 | A  | 6/1999  | Akazawa |
| 5,924,478 | A  | 7/1999  | Crocker |
| 6,027,572 | A  | 2/2000  | Labib et al. |
| 6,047,714 | A  | 4/2000  | Akazawa |
| 6,109,359 | A  | 8/2000  | Ballard |
| 6,276,459 | B1 | 8/2001  | Herrick et al. |
| 7,132,017 | B2 | 11/2006 | Laurence |
| 7,841,351 | B1 | 11/2010 | Kane et al. |
| 7,887,639 | B1 | 2/2011  | Ratliff et al. |
| 9,676,007 | B1 | 6/2017  | Kane et al. |
| 10,480,875 | B2 | 11/2019 | Metropoulos |
| 10,900,724 | B1 | 1/2021  | Staniulis, Jr. |
| 2003/0024552 | A1 | 2/2003 | Watanabe |
| 2006/0037736 | A1 | 2/2006 | Heyman |
| 2007/0125520 | A1 | 6/2007 | Nutsos |
| 2008/0041025 | A1 | 2/2008 | Boyer et al. |
| 2008/0078532 | A1 | 4/2008 | Nagashima et al. |
| 2008/0193650 | A1 | 8/2008 | Lyon |
| 2010/0078007 | A1 | 4/2010 | Post |
| 2010/0326470 | A1 | 12/2010 | Seippel |
| 2011/0056668 | A1 | 3/2011 | Taras et al. |
| 2014/0238643 | A1 | 8/2014 | Hains et al. |
| 2014/0284027 | A1 | 9/2014 | Pozzie et al. |
| 2015/0144303 | A1 | 5/2015 | Burfeind |
| 2015/0211819 | A1 | 7/2015 | Lindstrm et al. |
| 2016/0044909 | A1 | 2/2016 | Lampe |
| 2016/0054070 | A1 | 2/2016 | Calton |
| 2016/0279562 | A1 | 9/2016 | Williams et al. |
| 2017/0059119 | A1 | 3/2017 | Bennett et al. |
| 2017/0191768 | A1 | 7/2017 | Metropoulous |
| 2017/0292802 | A1 | 10/2017 | Billings |
| 2019/0257592 | A1 | 8/2019 | Fiello et al. |
| 2020/0041220 | A1 | 2/2020 | Metropoulos |
| 2020/0080799 | A1 | 3/2020 | Johns et al. |
| 2020/0208928 | A1 | 7/2020 | Korth et al. |
| 2020/0284534 | A1 | 9/2020 | Pess et al. |
| 2021/0170455 | A1 | 6/2021 | Kleinvachter et al. |
| 2021/0291206 | A1 | 9/2021 | Al-Otaibi |
| 2023/0280116 | A1 | 9/2023 | Metropoulos |

FOREIGN PATENT DOCUMENTS

| | | |
|---|---|---|
| CN | 202864069 U   | 4/2013 |
| CN | 103245252 A   | 8/2013 |
| CN | 104215120 A   | 12/2014 |
| CN | 104896711 A   | 9/2015 |
| CN | 108369081 A   | 8/2018 |
| EP | 3748245 A1    | 12/2020 |
| JP | 07-332891 A   | 12/1995 |
| JP | 09-061092 A   | 3/1997 |
| JP | 09-178394 A   | 7/1997 |
| JP | 10-205791 A   | 8/1998 |
| JP | 11-132593 A   | 5/1999 |
| JP | 11-132693 A   | 5/1999 |
| JP | 2000-226600 A | 8/2000 |
| JP | 2000-273001 A | 10/2000 |
| JP | 2007-178096 A | 7/2007 |
| JP | 2009-030932 A | 2/2009 |
| JP | 2013-094759 A | 5/2013 |
| WO | 02/94973 A1   | 11/2002 |
| WO | 2017/054515 A1 | 4/2017 |

OTHER PUBLICATIONS

International Search Report and Written Opinion received for PCT Patent Application No. PCT/US23/075198, mailed on Feb. 28, 2024, 12 pages.

International Search Report and Written Opinion received for PCT Patent Application No. PCT/US23/72857, mailed on Feb. 15, 2024, 14 pages.

Invitation to Pay Additional Fees received for PCT Patent Application No. PCT/US23/72857, mailed on Nov. 13, 2023, 2 pages.

International Preliminary Report on Patentability received for PCT Patent Application No. PCT/US2023/063744, mailed on Sep. 19, 2024, 10 pages.

International Search Report and Written Opinion received for PCT Patent Application No. PCT/US2023/063744, mailed on Aug. 11, 2023, 13 pages.

International Search Report cited in PCT Application No. PCT/US2016/054515 dated Dec. 2, 2016.

Outgoing—ISA/210—International Search Report Mailed on Jun. 8, 2023 for WO Application No. PCT/US23/062729, 3 page(s).

International Preliminary Report on Patentability received for PCT Patent Application No. PCT/US2023/072857, mailed on Mar. 6, 2025, 9 pages.

International Preliminary Report on Patentability received for PCT Patent Application No. PCT/US2023/075198, mailed on Apr. 10, 2025, 8 pages.

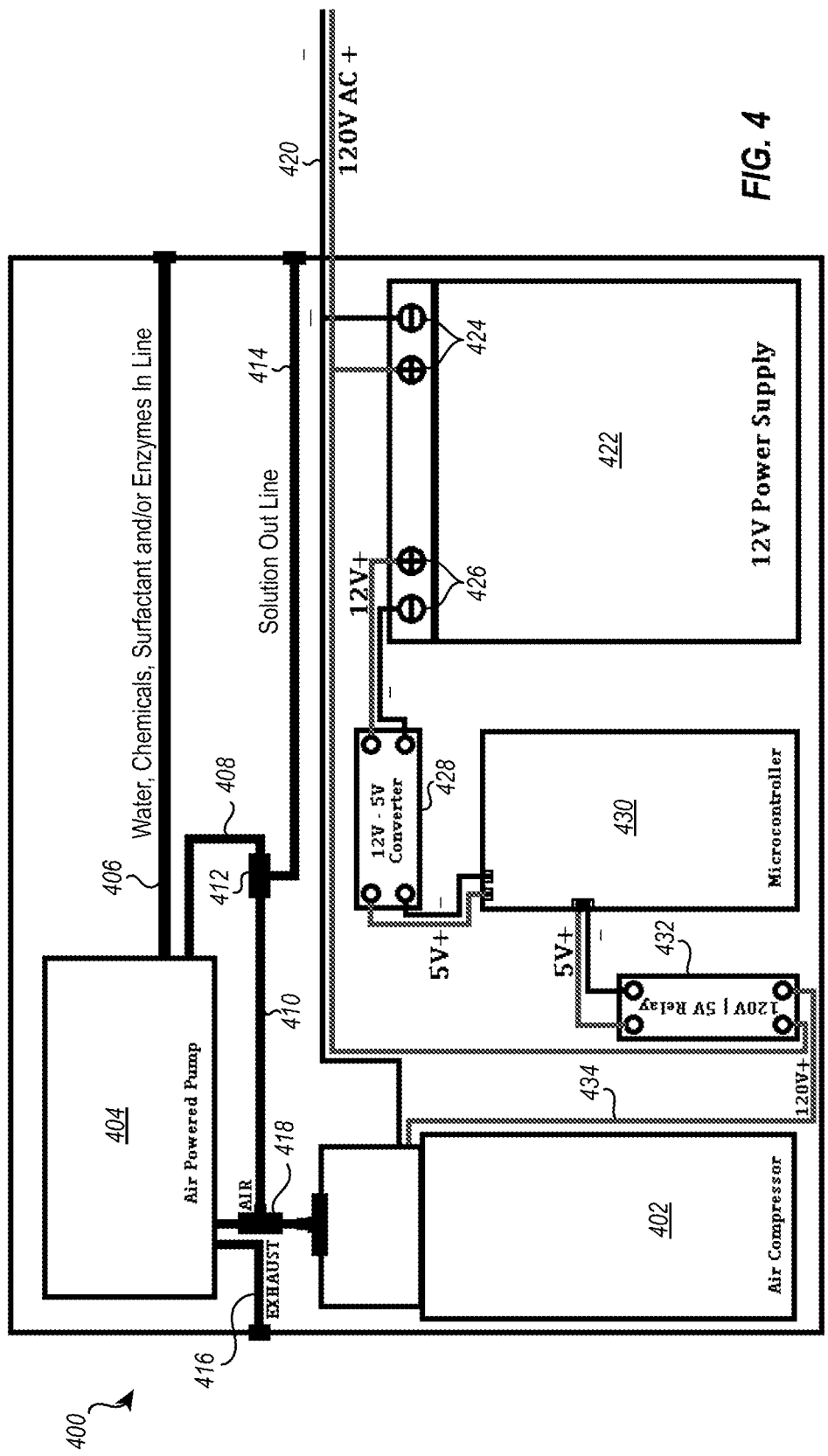

APPARATUS AND METHODS FOR SELF-CLEANING AND MAINTAINING HVAC HEAT TRANSFER COILS

CROSS-REFERENCE TO RELATED APPLICATION

This application claims the benefit of U.S. Provisional Application No. 63/310,734, filed Feb. 16, 2022, which is incorporated by reference in its entirety.

BACKGROUND

1. The Field of the Invention

The invention relates to apparatus, methods, and systems for automatically cleaning, sanitizing, and maintaining heat transfer coils of heating, ventilation, and air conditioning (HVAC) systems, and self-cleaning and maintaining HVAC systems configured to automatically clean, sanitize, and maintain heat transfer coils thereof.

2. The Relevant Technology

HVAC systems typically consume over 50% of a building's total energy. It is estimated that roughly half of this energy is wasted because the heat transfer coils in HVAC systems are operating in fouled condition. Such fouled coils are the primary source of many operational problems found within HVAC systems, such as excessive equipment wear and tear, decreased human health due to poor indoor air quality, and excessive energy consumption. Hydrocarbon buildup from outside air pollution, pollen, dust, and grease are examples of common materials causing coil fouling.

Another common form of fouling arises from the formation of bacteria and fungi deep inside the coils. This biological form of fouling is exceptionally problematic for HVAC systems. When microbes take root deep inside the coils, they begin to form biofilms, which is a plasticity type of membrane excreted by these micro-organisms. Biofilms are particularly detrimental to the HVAC system because these films are highly insulating, which works to inhibit heat transfer between the metal surfaces of the coil and the passing airflow. In addition, biofilms can have sticky surfaces that can accumulate dust and other fouling debris, thereby acting to inhibit airflow and efficient heat transfer through the coils.

When bacteria and fungi take root deep inside HVAC coils, many other operational problems can arise outside of inhibited airflow and heat transfer. As colonies of these microbes grow, their biological activity begins to off-gas noxious odors, creating a common problem in HVAC referred to as "Dirty Socks Syndrome"-a condition where the air supply in a building begins to present with a foul smell of dirty socks or other types of unpleasant smell.

For hospitals, biological fouling of HVAC coils is especially problematic and can present a near epidemic level problem for the global health care system. In the last several years, hospitals have seen a frightening rise of antibiotic-resistant bacteria, such as Staph, MRSA, and others, taking root within nearly all medical facilities. It is now becoming a relatively common occurrence for sick patients to come into a medical facility needing treatment for one condition and then becoming infected with an antibiotic-resistant strain of another illness contracted while visiting the hospital. In spite of extensive and vigilant sanitizing and cleaning efforts, medical facilities have so far been unable to eliminate dangerous microbes from the medical facility's operating environment. A major reason for this inability to eradicate dangerous microbes is due to the ability of antibiotic-resistant microbes to hide, thrive, and migrate through the medical facility via its HVAC system. Specifically, it is deep inside the coils where sickness-causing microbes often find safe refuge, and the HVAC ventilation system provides means for traveling throughout the medical facility.

Cooling coils of HVAC systems within large medical facilities can range in depth from 2 to 18 inches, typically 4 to 12 inches. Spacing between fins in the coils is extremely compact, with space measured in millimeters between each fin. The objective of the coils is to provide as much surface area as possible within a confined space, making the space between fins only large enough to permit air to pass through. In addition, the cooling coils in large facilities can vary widely from the very large air handlers to the much smaller, and very numerous ceiling fan coils and reheat coils, which are often located in difficult to access parts of facilities infrastructure, such as in the duct work and in ceiling crawl space areas. Larger coils often reach 15 feet in height and are sealed on top so that air can flow evenly through the coils. This means there is often no way to access coils from the sides and/or the tops of the system. The density of the packed coils serves to inhibit liquids from traveling more than 2 inches inside the coils, which leaves the vast majority of the internal coil surface area completely inaccessible for cleaning. For smaller fan coils and reheat coils, such systems experience the same operational difficulties in penetrating coils and are very difficult to access due to their location.

The result is that the internal surface area of HVAC cooling coils provides an ideal sanctuary for antibiotic resistance and all other bacteria and fungi, to take root and thrive within medical or other facilities. Because the objective of the HVAC system is to circulate air throughout the facility, dangerous microbes can be carried in the air stream and efficiently spread throughout the facility. While a medical facility can be extremely vigilant in cleaning all exposed surface areas throughout the facility, the inability to sanitize and disinfect deep inside the coils leaves these facilities exposed and unable to fully mitigate dangerous risks posed by traveling microbes. In addition to this adverse effect on indoor air quality, fouled coils greatly reduce both air flow through and heat transfer by the coils, which reduces overall performance and efficiency of a facility's HVAC system.

The standard practice employed throughout the HVAC industry, hotels, hospitals, and other facilities is to clean HVAC coils using pressure washers. Another practice is to inject highly caustic or acidic solutions into the coils via a pressure washer or a handheld pump spray device. Yet another practice is to inject steam into the coils. These practices are completely ineffective in penetrating completely through and removing dirt and debris from the coils, especially coils deeper than 6 inches. These processes are also ineffective in removing biofilms or in sanitizing and disinfecting deep internal surface areas of the coils. In addition, all of these processes require a complete shutdown of the air handler in order to service and are often damaging, wasteful, and hazardous to the environment.

Pressure washing, by far the most commonly employed practice for cleaning HVAC coils, involves the use of high-pressure water of at least 50-100 psi, often exceeding 1,000 psi, to create a pressurized stream of water that is applied to the coil's outer surfaces. However, the dense packing of the coils acts to prevent water from penetrating more than about 2 inches into the coils, regardless of the injection of high-pressure water. The tightly packed coils absorb the energy and deflect the pressurized water stream. In addition, due to the weight of water and force of gravity, when the pressurized water stream loses kinetic energy due to absorption by the coils, the water naturally falls vertically towards the ground.

Another weakness of pressure washing is that at 1,000+ psi (or even as low as 50-100 psi), the force of the pressurized water stream can quickly and easily bend the coil fins. The coils themselves are tightly packed and made from very thin, soft metals, such as aluminum or copper. Once coils have been bent and damaged, airflow is further restricted and made uneven, further reducing the flow-through efficiency of the air handler.

In addition, pressure washers utilize enormous quantities of water, i.e., from 6-20 gallons per minute depending on their size. At the smallest version of 6 gallons per minute, a 1-hour cleaning of coils can result in the consumption of 360 gallons of water. It is not uncommon to consume well over 1,000 gallons of water during the cleaning of one HVAC coil system.

Another problem, recognized in U.S. Pat. No. 9,676,007, is that pressure washing can drive debris more deeply and firmly into the coils and fins, further exacerbating the problem rather than solving it.

At higher pressures of 40 psi or more, 25 psi or more, 10 psi or more, or even 7 psi or more, stable detergent foams cannot exist because the pressurized air in the foam collapses to form a spray of liquid or droplets. This is readily observed at car washes, where cleaning foam is applied at low pressure, while rinse water is applied at high pressure, even though applying higher pressure foam, if possible, would be more effective at dislodging dirt. In addition, the compression of air and collapse of detergent foams at higher pressures greatly increase the concentration of water and reduces the concentration of air.

Another technique for cleaning heat transfer coils involves the use of a handheld pump spray and the direct injection of a caustic or acidic coil cleaner. This process is typically performed at lower pressure compared to high-pressure washers. The idea behind caustic coil cleaners is to remove biofilm buildup inside the coils. Unfortunately, biofilms can present a plasticity type of membrane that is impervious to caustic, acidic, and even oxidizing solutions. In addition, caustic solutions can actively react with and strip layers of metal molecules from the coil surfaces. This is highly damaging and often leads to complete destruction of the coils over a relatively short period of service time. Finally, the pump spray method of injecting a caustic solution into coils experiences the same physical issues of pressure washing where only the surface and perhaps a few inches in depth are actually penetrated.

Another technique used to clean heat transfer coils involves injecting the coils with high-temperature steam. In this process, high-temperature steam is injected directly into the coils with the hope that the steam will physically break down biofilm, bacteria, dirt, and grime. However, steam injection faces similar physical barriers as pressure washing because the outer coil surfaces can absorb the kinetic and heat energy of the injected steam and inhibit penetration to only a few inches. In addition, while steam may kill some bacteria and fungi near the outer coil surfaces, high temperatures are typically ineffective in removing the actual biofilm layer. In addition, the use of high-temperature steam in many physical locations within a facility is impractical and can set off fire systems due to excessive heat.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

This Summary is provided to introduce a selection of concepts in a simplified form, which is further described below in the Detailed Description. This Summary is not intended to identify key features or essential features of the claimed subject matter, nor is it intended to be used as an aid in determining the scope of the claimed subject matter.

Described herein are apparatus, methods, and systems for automated self-cleaning and maintenance of heat transfer coils of an HVAC system, such as evaporator coils used to cool air within a building (i.e., heat is transferred from the incoming air to the coolant in the evaporator coil). The apparatus and systems can be retrofitted onto existing HVAC systems and/or can be incorporated into new HVAC systems. The apparatus, methods, and systems can be used to clean a condenser coil, which is configured to transfer heat outside the building (i.e., heat is transferred from the coolant to the outside air), but the build-up of microbes outside a building is less problematic and less important. In the air-cooling side, the air handler of the HVAC system causes air to flow through the cooling coil to transfer heat energy from the air to the coil. In particular, warm air is caused to enter a first side of the cooling coil and cooled air to exit a second side of the cooling coil.

The cleaning apparatus includes a foam or spray generator, which can inject detergent and enzymes, or other variations of chemical formulations, either in a foam phase or in a micro droplet type of application through one or more manifolds (e.g., in the form of one or more pipes), one or more couplers, and a controller. The foam or spray generator is configured to generate cleaning foam or a maintenance spray. The manifolds are configured to receive the cleaning foam or maintenance spray generated by the generator. Each of the one or more manifolds includes one or more emitters configured to emit the cleaning foam or maintenance spray. The one or more couplers are configured to couple the one or more manifolds onto the HVAC system, such that the one or more emitters are configured to emit the cleaning foam or maintenance spray onto the first side of the heat transfer coil. The controller is configured to cause the foam or spray generator to generate the cleaning foam or spray and cause the emitters to emit the foam or spray.

In some embodiments, a fan can be used to cause air to flow through the HVAC coils. The controller is configured to cause a foam generator to generate foam or spray and cause the emitters to emit the foam or spray when the fan is running, such that the fan causes the foam or spray to flow through the heat transfer coil to clean debris off and/or apply enzymes or other chemicals to the heat transfer coil. In some embodiments, a foam or spray can be applied to the heat transfer coils without the fan running or running at a reduced speed in order for the foam or spray to remain in the coils for a period of time in order to deposit enzymes or chemicals onto internal surfaces within the heat transfer coil. Spent foam or liquid that exits the back side of the heat transfer coil can be removed by flowing into a typical drain used to collect condensed water produced by a cooling coil.

Some embodiments described herein are related to a self-cleaning, self-maintaining HVAC system. The self-cleaning HVAC system includes a heat transfer coil (e.g., but not limited to an air-cooling evaporator coil and/or a heatejecting condenser coil), a fan, a foam or spray generator, one or more manifolds, one or more couplers, and a controller. A cooling evaporative coil is configured to remove heat from air passing through the coil (as compared to a condenser coil, which expels heat into air passing through the coil). The fan (e.g., air handler or blower fan) is configured to cause air to flow in from a first side of the heat transfer coil and to flow out of a second side of the heat transfer coil. The foam or spray generator is configured to generate foam or a more fluid spray. The manifolds are configured to receive the foam or spray generated by the generator. Each of the one or more manifolds includes one or more emitters configured to emit the foam or spray. The one or more couplers are configured to couple the one or more manifolds onto the heat transfer coil, such that the one or more emitters are configured to emit the foam or spray onto the first side of the coil.

The controller can be configured to cause the generator to generate the foam or spray and cause the one or more emitters to emit the foam or spray in a desired pattern or time interval in order to carry out one or more desired treatments. In the case of cleaning foam, for example, the controller can be configured to cause foam and/or spray to be applied to the heat transfer coil when the fan is running. In such case, moving air from the fan causes the foam or spray to flow through the heat transfer coil to dislodge and remove microbes, dirt, and debris from the small spaces within the heat transfer coil. Foam and any removed debris that exits the heat transfer coil can be drained or removed using means known in the art. Alternatively, the foam or spray can be applied to the heat transfer coils without the fan running or running at a reduced speed to increase contact time. For example, the fan can initially run to draw cleaning foam deep into the coils and then turned off for a time period to allow the foam or maintenance spray to remain in contact with the inside surfaces of the coils. After a pre-determined time period has elapsed, the fan may be turned back on to resume pushing or drawing foam or maintenance spray through the coils.

In some embodiments, the foam or spray generator includes an air compressor and a pressure chamber. The pressure chamber includes a chemical input port configured to receive one or more chemicals, an air input port configured to receive pressurized air from the air compressor, a water input port configured to receive water, and a pressure controller configured to control a pressure in the pressure chamber, causing a pressurized mixture of the one or more chemicals, air, and water to form the foam or spray. The pressure chamber also includes one or more output ports configured to output the foam or spray. The foam or spray generator also includes a communication interface configured to communicate with the controller.

In some embodiments, the pressure chamber further includes at least one of (1) an air inflow controller configured to control an inflow of the pressurized air, (2) a chemical inflow controller configured to control an inflow of the one or more chemicals, (3) a water inflow controller configured to control an inflow of the water, and/or (4) a foam outflow controller configured to control an outflow of the foam.

In some embodiments, the controller is further configured to generate a control signal to control at least one of (1) a pressure of the pressure chamber, (2) an air inflow of the pressure chamber, (3) a chemical inflow of the pressure chamber, (4) a water inflow of the pressure chamber, or (5) a foam outflow of the pressure chamber. In some embodiments, the controller includes a user interface configured to receive a user input to set at least one of (1) a pressure of the pressure chamber, (2) an air inflow of the pressure chamber, (3) a chemical inflow of the pressure chamber, (4) a water inflow of the pressure chamber, or (5) a foam outflow of the pressure chamber.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not, therefore, to be considered to be limiting in scope, embodiments will be described and explained with additional specificity and details through the use of the accompanying drawings in which:

FIG. 4 is a diagram that schematically illustrates an example system for automatically generating cleaning foam or maintenance spray for delivery to a heat transfer coil, such as in FIGS. 1A-1C, 2, and/or 3A-3B;

DETAILED DESCRIPTION

Disclosed herein are cleaning and maintenance apparatus and methods for self-cleaning and maintaining a heat transfer coil (e.g., an evaporator coil and/or a condenser coil) of an HVAC system and a self-cleaning and maintenance HVAC system. Reference is now made to the drawings.

Figure 1A:
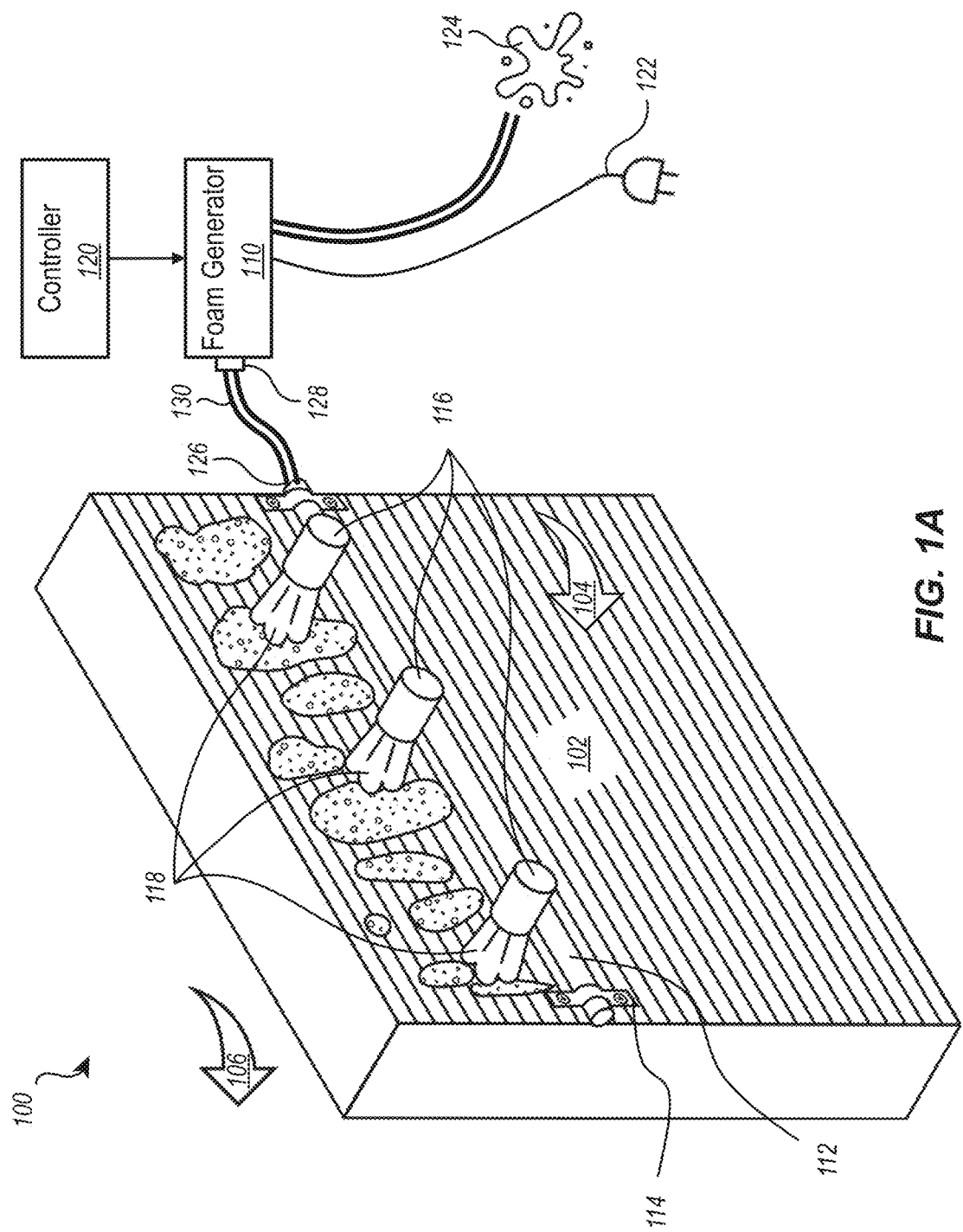
FIG. 1A illustrates an example cleaning and maintenance apparatus installed on an evaporator coil of an HVAC system, where the cleaning apparatus includes a controller, a foam or spray generator, and a manifold having a plurality of emitters configured to emit foam or spray onto a front side of the evaporator coil.

FIG. 1A illustrates an example of a self-cleaning and maintenance HVAC system 100, including a heat transfer (e.g., evaporator) coil 102 and an air handler (not shown). The heat transfer coil 102 in this embodiment is configured to cool air, and an air handler (not shown) is configured to cause warm air to flow through the heat transfer coil 102 to be cooled. In particular, the air handler (e.g., fan 140 illustrated in FIG. 1D) causes air (represented by arrows 104, 106) to flow into a first side of the heat transfer coil 102 (e.g., the front side of the heat transfer coil 102 shown in FIG. 1A) and flow out of a second side (not shown) of the heat transfer coil 102. Arrow 104 represents air inflow into the front side of the heat transfer coil 102 and arrow 106 represents air outflow out of the back side of the heat transfer coil 102.

A cleaning and maintenance apparatus is installed (e.g., retrofitted) on the heat transfer coil 102 and configured to clean and maintain the heat transfer coil 102 automatically. The cleaning apparatus includes a foam or spray generator 110, a manifold 112, one or more couplers 114, one or more emitters 116 configured to emit cleaning foam and/or maintenance spray 118, and a controller 120. The foam or spray generator 110 is connected to a power source 122 and a water source 124. The foam or spray generator 110 includes a chemical container for storing therein one or more chemicals. The foam or spray generator 110 is configured to mix water, air, and chemical(s) to generate one or more types of foam or fluid spray (e.g., deep cleaning foam, disinfecting foam or spray, coil treatment foam or spray, deodorizing foam or spray, fragrance-imparting foam or spray, and the like).

The manifold 112 is configured to receive foam or spray generated by the foam or spray generator 110 and distribute it to one or more emitters 116 that emit foam or spray 118. In some embodiments, the manifold 112 includes an input port 126, and the foam or spray generator 110 includes an output port 128. The input port 126 of the manifold 112 is configured to be connected to the output port 128 of the foam or spray generator 110, such as by a connecting pipe or tube 130. The manifold 112 is connected to the one or more emitters 116 configured to emit the foam or spray 118. The one or more couplers 114 are configured to couple the manifold 112 to the heat transfer coil 102.

The one or more emitters 116 are configured to emit the foam or spray onto the first side of the heat transfer coil 102. The controller 120 is configured to cause the foam or spray generator 110 to generate the foam or spray and/or cause the one or more emitters 116 to emit the foam or spray when the air handler or auxiliary fan (e.g., fan 140 illustrated in FIG. 1D) is running, such that the air handler or auxiliary fan 140 causes the foam or spray to flow through the heat transfer coil 102 to thereby clean debris from the small spaces and surfaces within the heat transfer coil 102.

In some embodiments, the foam or spray can be applied to the heat transfer coil 102 when the air handler (or other fan) 140 is not running or is running at reduced speed. This permits the foam or spray to remain in a fixed place and/or to run or drip down to lower levels of the heat transfer coil 102. When the entire front surface of the heat transfer coil 102 has been covered with foam or spray, the air handler (or other fan) 140 can be turned on and/or accelerated to draw the foam or spray into the heat transfer coil 102. This sequence can be repeated as desired to apply sufficient form or spray to clean and/or maintain the heat transfer coil 102.

Figure 2:
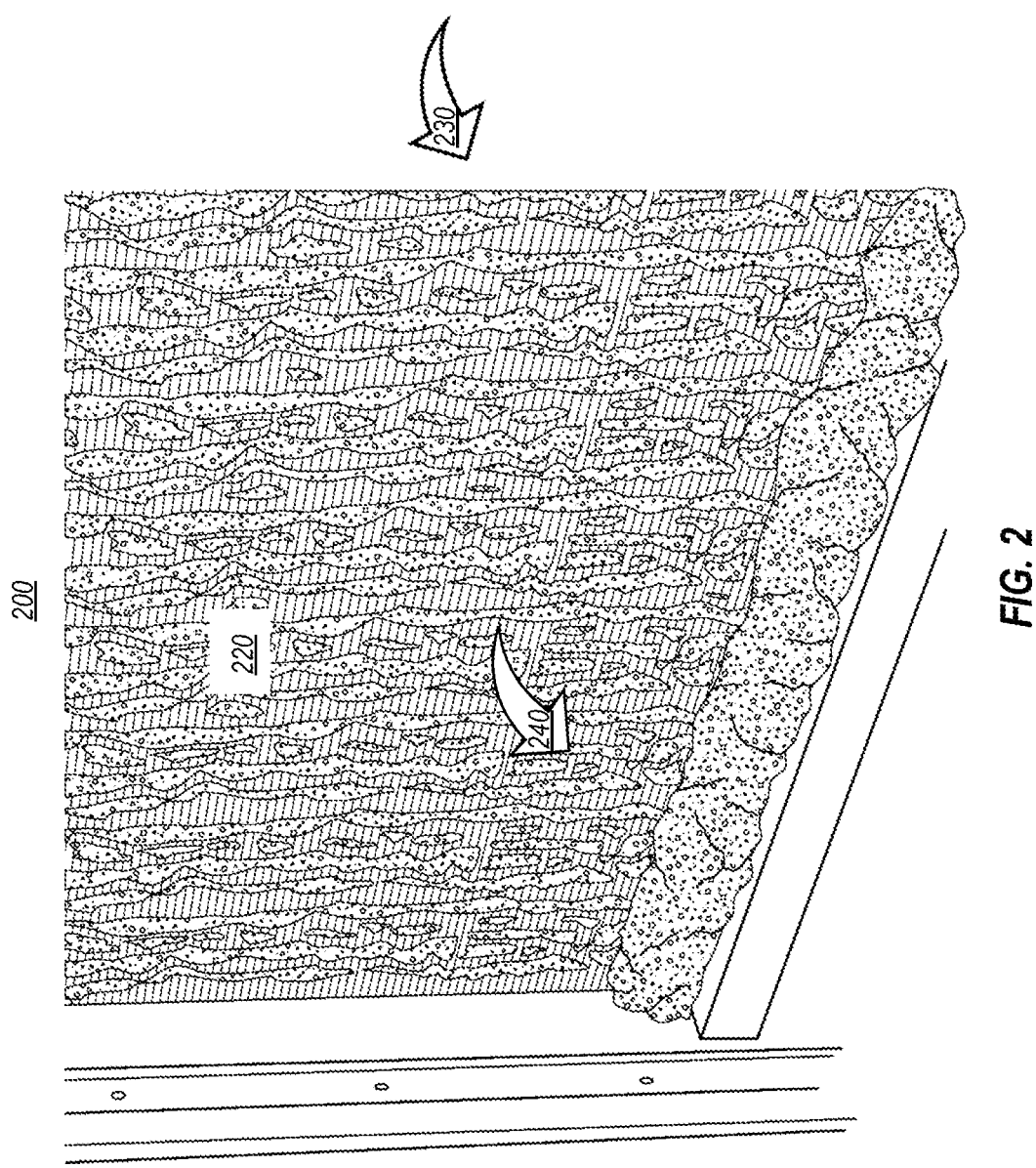
FIG. 2 illustrates a back view of the evaporator coil of the HVAC system of any of FIGS. 1A-1C.

FIG. 2 illustrates how foam, liquid and debris applied to the front side of a heat transfer coil 200 exits the back side 220 of the coil 200). The foam, liquid and debris can be removed by known means, such as a drain (e.g., the same drain used to remove condensed water from the HVAC system).

Figure 1B:
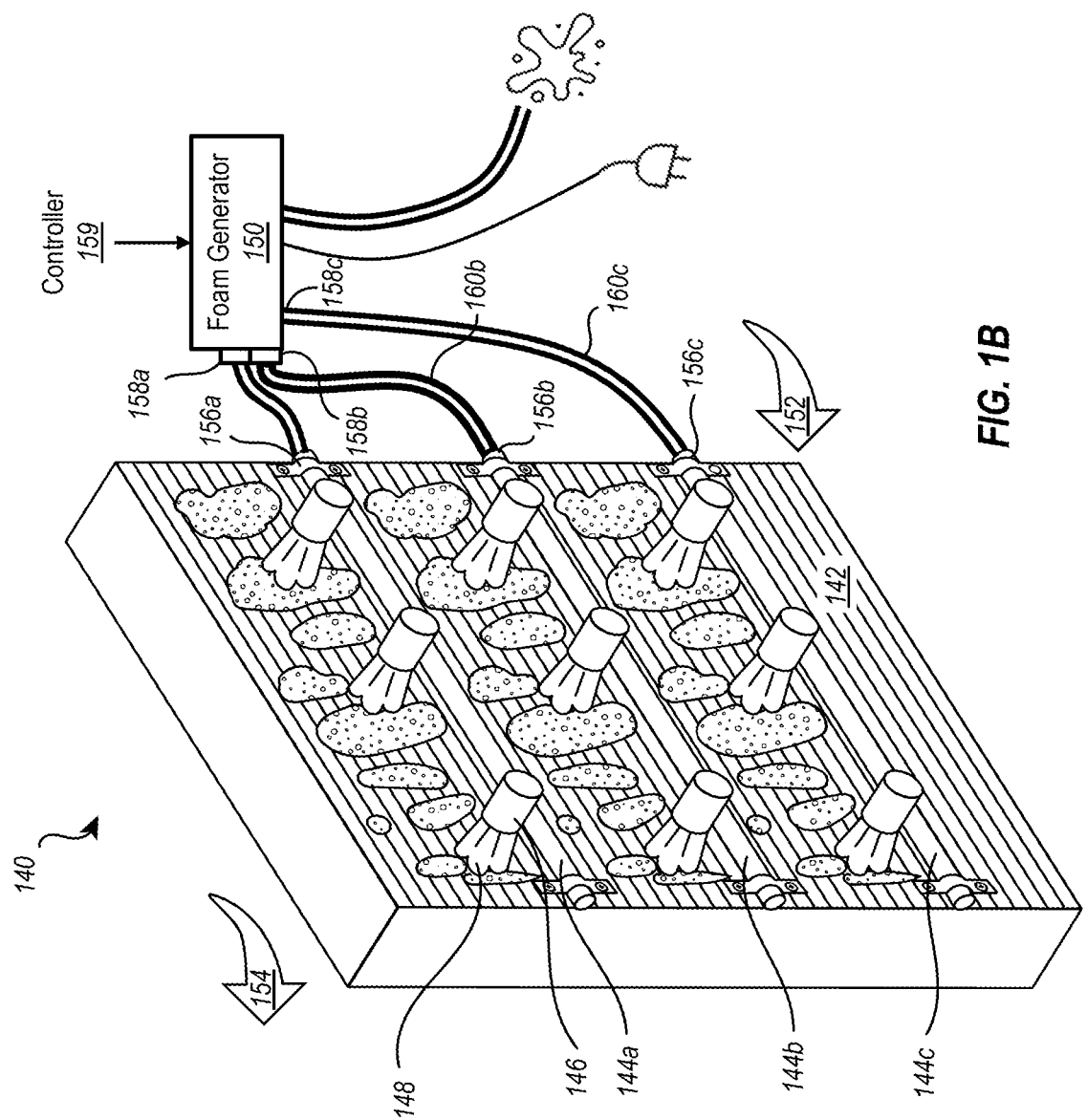
FIG. 1B illustrates another example cleaning and maintenance apparatus installed on an evaporator coil of an HVAC system, where the cleaning apparatus includes a plurality of manifolds, each of which has a plurality of emitters configured to emit foam or spray onto a front side of the evaporator coil.

In some embodiments, a cleaning and maintenance apparatus 140 can include a plurality of manifolds 144 to distribute foam or spray across a larger area. FIG. 1B illustrates an example of the cleaning and maintenance apparatus 140 for cleaning a heat transfer coil 142, including a plurality of manifolds 144a, 144b, 144c. In some embodiments, the plurality of manifolds 144 can be interconnected and one of the plurality of manifolds can be connected to an output port 158 of a foam or spray generator 150 by a connecting pipe or tube 160. Alternatively, each of the plurality of manifolds 144a, 144b, 144c can include a dedicated input port 156a, 156b, 156c. In such case, the foam or spray generator 150 can include a plurality of dedicated output ports 158a, 158b, 158c, each connected to a respective input port 156a, 156b, 156c of each manifold 144a, 144b, 144c by a dedicated connecting pipe or tube 160a, 160b, 160c. An advantage of this system is that it can distribute foam or spray across a larger area, e.g., an entire front surface of the heat transfer coil 142.

Figure 1C:
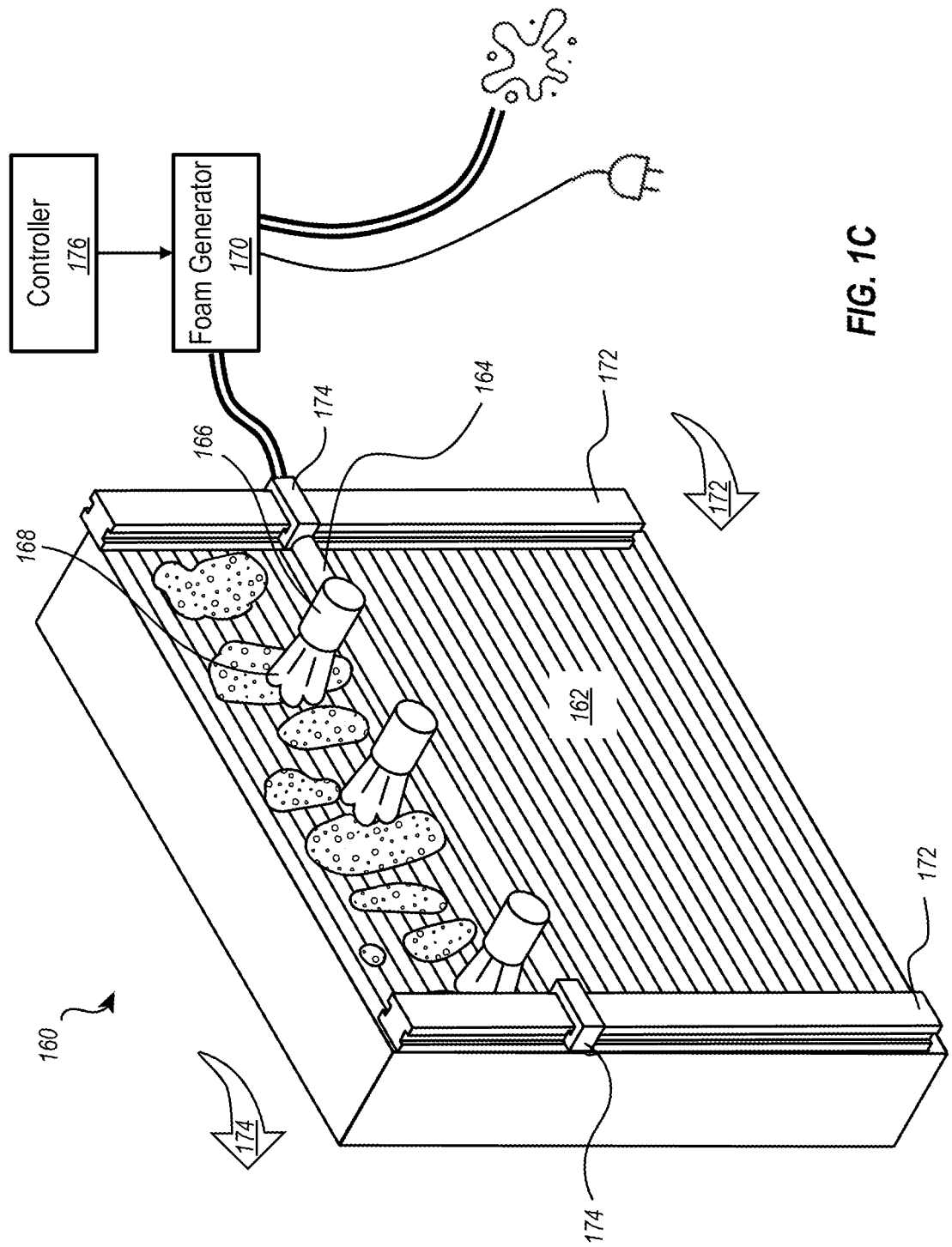
FIG. 1C illustrates another example cleaning and maintenance apparatus installed on an evaporator coil of an HVAC system, including a movable manifold having a plurality of emitters, where the movable manifold is configured to move across a front side of the evaporator coil while emitting foam or spray thereon.

In some embodiments, the cleaning and maintenance apparatus 160 can include a movable manifold configured to move across a front side of a heat transfer coil 162. FIG. 1C illustrates an example of a cleaning and maintenance apparatus 160, including a movable manifold 164 configured to move across a front side of the heat transfer coil 162 (e.g., by moving vertically and/or horizontally). In some embodiments, one or more rails 172 are installed on the front side of the heat transfer coil 162, and the manifold 164 is movably coupled to the one or more rails 172 by mechanism(s) 174, which can be passive or motorized. In some embodiments, a motor in or associated with the rails(s) 172, mechanism(s) 174, and/or the manifold 164 is configured to move the manifold 164 in a desired pattern and speed across the front side of the heat transfer coil 162. A controller 176 can be configured to control both a foam generator 170 and the motor, which in turn controls movement of the manifold 164. Movement of the manifold can be patterned to move up and down the front surface of the heat transfer coil 162 one or more times to distribute a desired quantity of foam or spray. The controller can control the speed, movement, frequency, and other aspects of application.

Figure 1D:
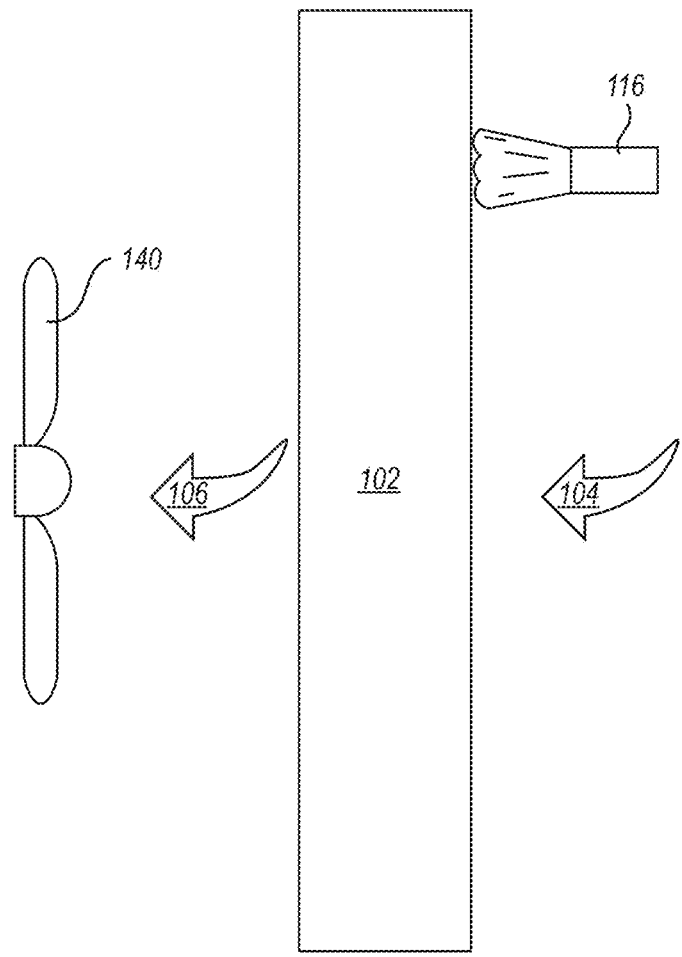
FIG. 1D is a side view of the embodiment of FIG. 1A and schematically illustrates the example cleaning and maintenance apparatus installed on a heat transfer coil of an HVAC system, including emitters configured to apply foam or spray onto the front side of the heat transfer coil and a fan (e.g., air handler or auxiliary fan) that causes air to flow into the front side of the heat transfer coil and exit the back side of the heat transfer coil and also cause foam or spray applied by the emitters onto the front side of the heat transfer coil to flow through the heat transfer coil and exit the back side of the heat transfer coil.

FIG. 1D illustrates how the air handler or auxiliary fan 140 causes inflow of air (represented by arrow 104) into the front side of the heat transfer coil 102 and outflow of air (represented by arrow 106) to exit the back side of the heat transfer coil 102. As described above with respect to FIG. 1A, the air handler or auxiliary fan 140, when running, causes foam or spray applied to the front side of the heat transfer coil 102 to flow through the heat transfer coil 102 to clean debris from the small spaces and surfaces within the heat transfer coil 102 and exit out the back side of the heat transfer coil 102.

For any of the embodiments in FIGS. 1A-1C and 2, the controller (120, 159, 176) can be configured to cause the foam or spray generator (110, 150, 170) to generate the foam or spray and/or cause the one or more emitters (116, 148, 166) to emit the foam or spray when the air handler or auxiliary fan (e.g., fan 140 illustrated in FIG. 1D) is running, such that the air handler or auxiliary fan causes the foam or spray to flow through the heat transfer coil (102, 142, 162) to thereby clean debris off the coil. Alternatively, the foam or spray can be applied to the heat transfer coil when the air handler or auxiliary fan is not running or is running at reduced speed, which permits the foam or spray to run or drip down to lower levels of the coil. When the entire front surface of the heat transfer coil has been covered with foam or spray, the air handler or auxiliary fan can be turned on and/or accelerated to draw the foam or spray into the coil. This sequence can be repeated as needed to apply sufficient form or spray to clean and/or maintain the heat transfer coil.

Figure 3A:
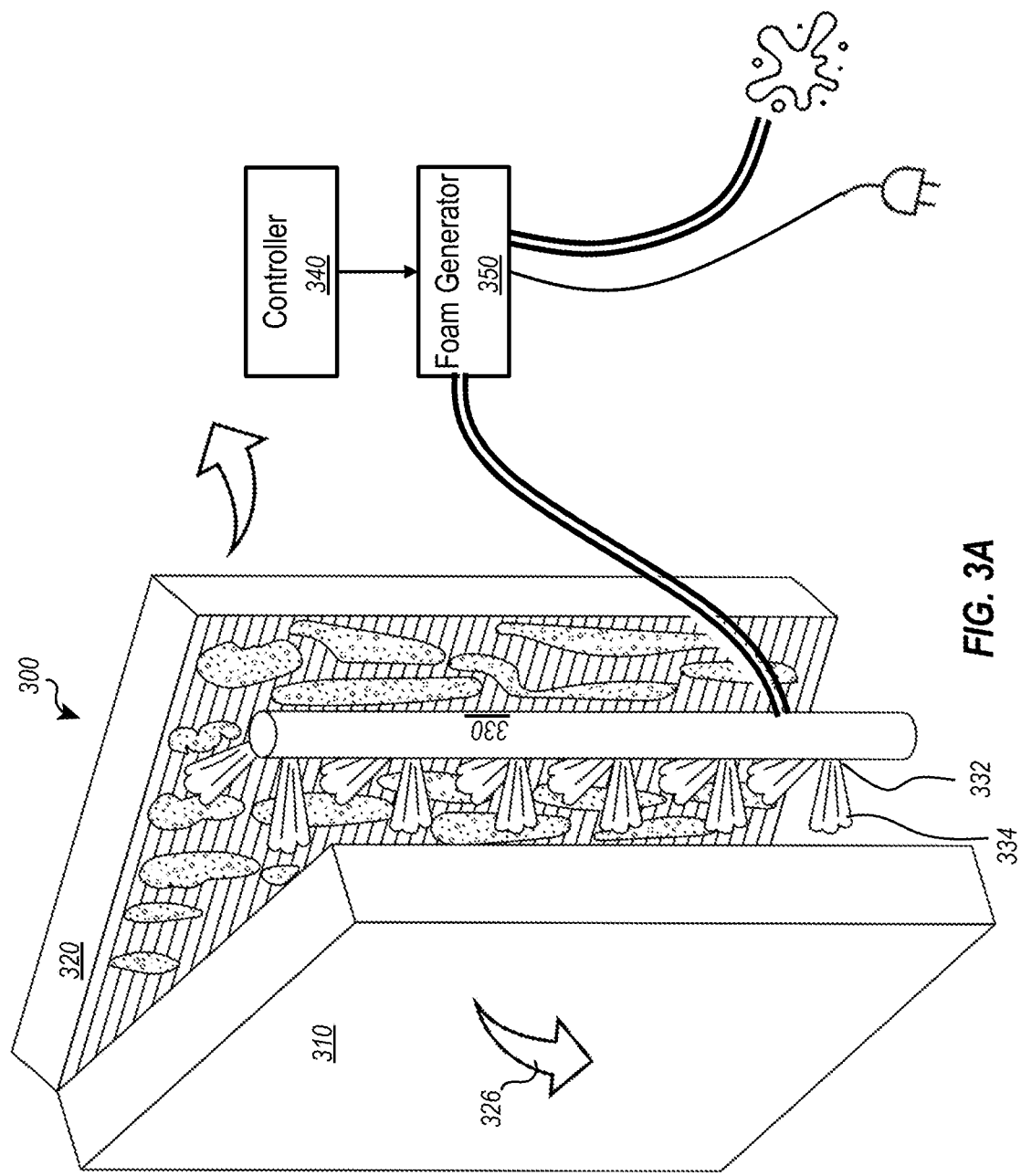
FIG. 3A is a perspective view of an example cleaning and maintenance apparatus installed on an A-shaped evaporator coil of an HVAC system.
Figure 3B:
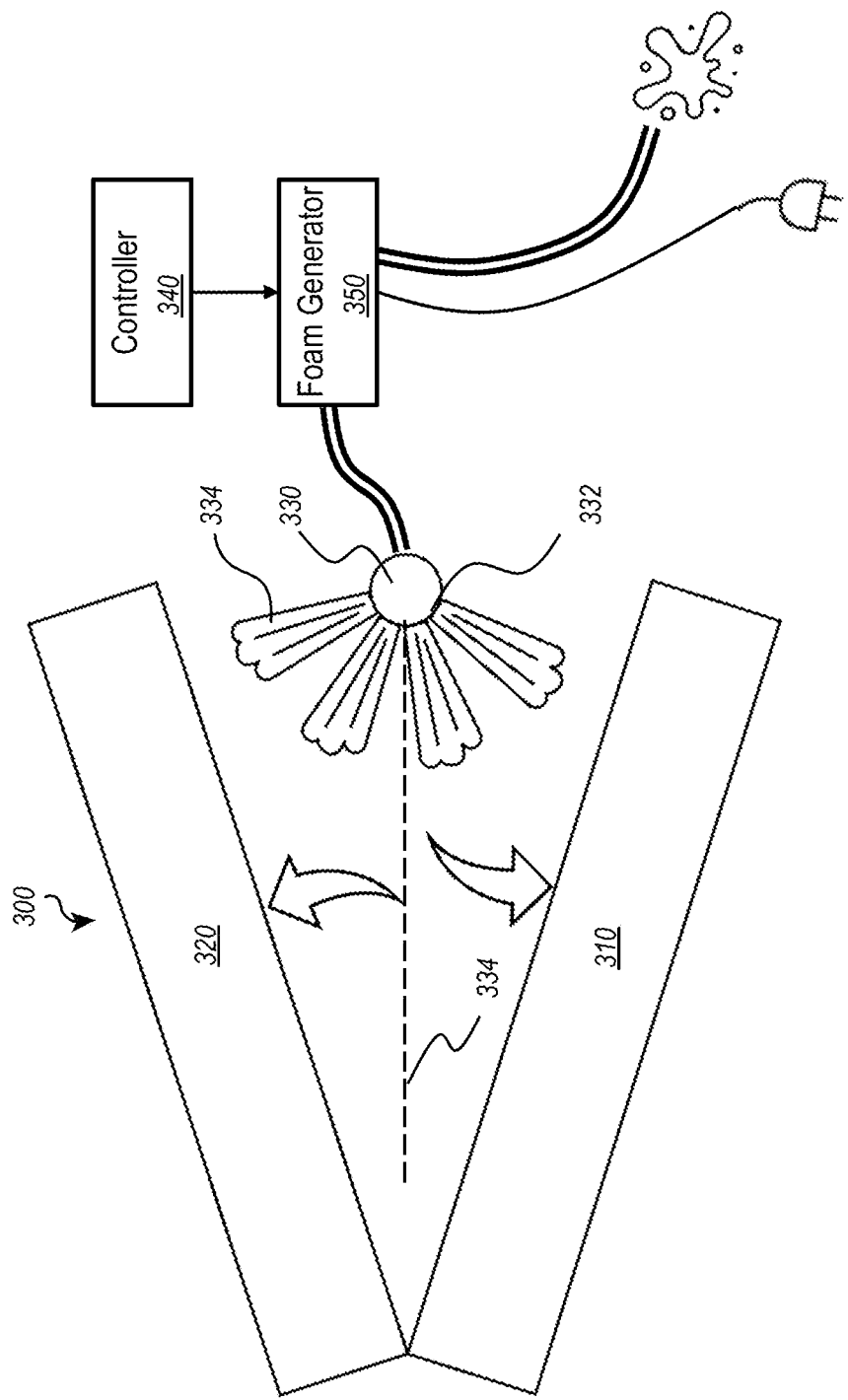
FIG. 3B is a top view of the A-shaped evaporator coil of the HVAC system of FIG. 3A.

In some embodiments, a similar cleaning and maintenance apparatus shown in FIGS. 1A-1C can be installed on an A-shaped or N-shaped heat transfer coil. FIG. 3A is perspective view and FIG. 3B is a top view of an example A-shaped heat transfer (e.g., evaporator) coil 300. In this illustrated embodiment, the A-shaped evaporator coil 300 includes two rectangular-shaped coil panels 310, 320. The two rectangular-shaped coil panels 310 and 320 are joined at a first end and open at a second end opposite to first end, forming an A shape. As illustrated in FIGS. 3A and 3B, the cleaning and maintenance apparatus includes a manifold 330, a controller 340, and a foam or spray generator 350. The manifold 330 can be disposed between the two coil panels 310, 320 so that a longitudinal axis of the manifold 330 is parallel to planes defined by a surface of the coil panels 310, 320. A plurality of emitters 332 are disposed along the manifold 330. Some of the emitters 332 are configured to emit foam or spray 334 toward the first coil panel 310, and some of the emitters 332 are configured to emit foam or spray 334 toward the second coil panel 320. It is also possible for at least some emitters 332 to spray foam or liquid 334 in both directions. During operation, the foam or spray passes through the coil panels 310, 320 and exits the back side as discharge 326.

Referring to FIG. 3B, in some embodiments, the manifold 330 can be configured to move along a rail 334. As illustrated in FIGS. 3A and 3B, the manifold 330 is oriented vertically and configured to move horizontally relative to coil panels 310, 320 to fully treat the entire front surface of the coil 300. Notably, the embodiment shown in FIGS. 3A and 3B is merely an example embodiment. In some embodiments, the manifold 330 can be oriented in a different direction (such as, but not limited to horizontally and/or diagonally), and configured to move in a different direction (such as, but not limited to vertically and/or diagonally back and forth to provide full coverage of coil panels 310, 320).

A controller 340 is configured to cause a foam or spray generator 350 to generate the foam or spray and/or cause the one or more emitters 332 to emit the foam or spray when a fan (e.g., fan 140 illustrated in FIG. 1D) is running, such that the fan causes the foam or spray to flow through the heat transfer (e.g., evaporator) coil 300 to thereby clean debris off the evaporator coil 300. In some embodiments, the controller 340 is also configured to control movement of the manifold 330. Alternatively, the foam or spray can be applied to the evaporator coil 300 when the fan is not running or is running at reduced speed. The fan can then be turned on and/or accelerated as desired to draw the foam or spray into the evaporator coil 300. This sequence can be repeated as needed to apply sufficient form or spray to clean and/or maintain the evaporator coil 300. In some cases, a liquid or thin foam can be volumized by moving air after being applied to the evaporator coil.

The foam generator (110, 150, 170, 350) shown above can be configured to generate varying types and volumes of foam or spray. The foam generator (110, 150, 170, 350) can be powered by compressed air and includes means for receiving water (e.g., a water input port), means for receiving pressurized air (e.g., an air input port), means for receiving chemicals and enzymes (e.g., one or more enzyme and/or chemical input ports), and means for receiving a surfactant (e.g., a surfactant input port). Air and water can be introduced into the foam generator (110, 150, 170, 350) under pressure, while enzymes, chemical(s) and/or surfactants can be drawn from one or more unpressurized vessels by one or more pumps (not shown) and pressurized to a desired pressure and flow rate.

Altering the ratio of input components yields different types of cleaning foam and/or spray. The different types of cleaning foams include (but are not limited to) thicker cleaning foam, thinner cleaning and/or treatment foam, richer foam, diluted foam, adherent foam, runny foam, and the like. The different types of spray include (but are not limited to) a mist or fog with different-sized droplets. A water valve (not shown) can control the flow and pressure of water delivered to a mixing manifold (not shown), which serves as a mixing chamber where the components are mixed to make a desired cleaning foam or spray. An air valve (not shown) can control the flow and pressure of air delivered to the mixing manifold. A first needle valve can control the flow and pressure of enzymes and/or chemical(s) into the mixing manifold, and a second needle valve (not shown) can control the flow and pressure of surfactant into the mixing manifold. By means of such valves, the skilled person one can adjust attributes of the cleaning foam or maintenance spray, such as desired consistency, chemistry, volume, pressure, and the like.

In some embodiments, different types of cleaning foams and/or maintenance sprays are designed for different purposes. In some embodiments, it may be desirable to perform a deep cleaning cycle (e.g., once or twice a year) to remove biofilms and debris that have built up on the evaporator coil over time. For deep cleaning, one or more cycles of cleaning foam containing water, surfactant, and optional chemicals and enzymes can be applied to the heat transfer coil(s) for a sufficient time period to remove substantially all debris. The cleaning foam and debris that exits that back side of the heat transfer coil can be removed by known means, such as by one or more permanent drains (e.g., condensation collecting drain) or temporary conduits.

Between deep cleaning cycles it may be desirable to perform periodic maintenance treatments (e.g., monthly, weekly, or bi-weekly). For example, thinner foam, mist, or fog containing treatment agents, such as enzymes, chlorine, chlorine dioxide, hydrogen peroxide, antimicrobials, fragrances, and the like, can be applied for any purpose. One example is to prevent the future buildup of biological debris such as biofilms. In some embodiments, the mist or fog contains fragrance to refresh the air that enters the building.

In some embodiments, the foam generator (110, 150, 170, 350) can be set or programmable to generate a sequence of different types of foams and/or sprays. For example, the mist or fog may be applied in short bursts (such as a few seconds, a minute) periodically at a first frequency (such as hourly, daily, weekly, monthly), and the foam may be applied for longer periods (such as half an hour, an hour, a few hours) at a second frequency (such as semi-annually or annually).

In some embodiments, the foam generator (110, 150, 170, 350) can be adjusted to alter the foam or spray generation rate. For example, the foam or spray generation rate may be set based on a capacity of a drain or drainage system that drains or removes the residual foam or spray that exits the back of the heat transfer coil. In some embodiments, each cleaning operation may include multiple sub-operations. For example, in some embodiments, in each sub-operation, a predetermined amount of foam or spray can be generated and caused to flow through the coil. After the predetermined amount of foam has been substantially removed and drained, a next sub-operation can begin.

The amount of foam produced by the foam generator (110, 150, 170, 350) can be controlled by air pressure used to operate the pumps for the various components. Controlling air pressure to the pumps controls the rate at which the pumps pump their respective components to the mixing manifold. Increasing the air pressure increases the rate of pumping, and lowering the air pressure reduces the rate of pumping (e.g., 10 psi for a flow rate of 0.5 gallons per minute (GPM), 20 psi for a flow rate of 0.74 GPM).

It will be appreciated that the foregoing air pressures are the pressure of the air when entering the foam generating system, such is used to operate the internal machinery, including valves and the like. It is not the pressure of the foam exiting the nozzle, which is substantially lower. As mentioned above, the cleaning foam discharged from the output port or nozzle is advantageously discharged at low pressure, i.e., at a pressure typically no greater than about 8 psi, preferably no greater than about 5 psi, more preferably no greater than about 3 psi, even more preferably greater than about 1 psi, such as a pressure of about 0.5 psi or less.

A technician can determine and control the flow rate of different types of liquid or other chemicals through the foam generator (110, 150, 170, 350), such as by altering the air pressure to the pumps. By way of illustration, keeping in mind that the system can be adjusted to provide different flow rates at selected air pressures, 10 psi of air pressure can produce a flow rate of 0.50 gallon per minute (GPM), and 20 psi of air pressure can produce a flow rate of 0.74 GPM. This setup allows the technician to adjust the foam or spray generating process to very precise settings so that the volume and percentages of mixing ratios can quickly and easily be determined, providing the ability to make specified cleaning foams or sprays containing exact volumes of cleaning solution and surfactant ratios.

Adjusting the valves, either manually or automatically, can control the flow of air, water and chemicals in the mixing manifold. Regulation of pressurized air into manifold mixing chamber enables the technician to control the type of foam or spray desired. For example, adding a higher volume of pressurized air into the mixing manifold can create a volumized and thick shaving cream-like foam. The foam thickness can also be controlled by the volume of surfactant and water, which directly affects the ability to generate the type of foam desired. For example, more water and less surfactant will produce a mostly aerosolized type of product. More surfactant and low water will produce an extremely thick foam.

FIG. 4 is a diagram that schematically illustrates an example foam or spray generation and delivery system 400 for automatically generating cleaning foam or maintenance spray and delivering it to one or more heat transfer coils, such as in FIGS. 1A-1C, 2, and/or 3A-3B. The generation and delivery system 400 includes an air compression 402, which generates air that can serve the dual purpose of providing pneumatic power to one or more pumps 404 and pressurized air to deliver cleaning foam or maintenance spray to a desired location.

The one or more air powered pumps 404 are configured to receive desired inputs, such as water and one or more of chemical(s), surfactant or enzymes via input line(s) 406. In some cases, the desired inputs can be provided in the form of an aqueous solution containing water and one or more of chemical(s), surfactant or enzymes, which can change depending on the desired cleaning form or spray to be delivered to one or more heat exchange coils (not shown). The air powered pump(s) 404 can output a treatment solution stream 408, which can be combined with a side stream of pressurized air 410 from the air compressor 402 by means of a mixing manifold 412 to form a pressurized treatment solution stream 414. Exhaust gas can be expelled by an exhaust line 416 (e.g., to discharge water, water vapor, oil, etc.).

An air distribution controller 418 can provide a desired quantity and pressure of air to both the air powered pump(s) 404 and the mixing manifold 412. The mixing manifold 412 mixes the treatment solution stream 408 with the pressurized air side stream 410 to create the pressurized treatment solution stream 414. The relative amounts of the treatment solution stream 408 and pressurized air side stream 410 can be modified as desired to produce a desired type of pressurized treatment solution stream 414 to be delivered to one or more heat exchange coils.

A power supply line 420 provides power to run the foam or spray generation and delivery system 400. Although labeled as "120 V AC+" it will be understood that the power supply line 420 can provide power of other voltages, such as 220 volts, 240 volts, 330 volts, 360 volts, 440 volts, an the like. In addition, the power supply line 420 can be AC or DC. The power supply line 420 can be configured to provide power to a 12-volt power supply (e.g., battery) 422 and also to the air compressor 402. A transformer (not shown) converts power from the power supply line 420 to the appropriate voltage and delivers it to input electrodes 424 to recharge the 12-volt power supply 422. Output electrodes 426 deliver direct current to a voltage converter 428, which converts higher voltage (e.g., 12 volts) of direct current to a stepped down voltage (e.g., 5 volts), which is used to power a microcontroller 430.

The microcontroller 430 can be programmed and configured to tell the system 400 when and how to operate. In one aspect, the microcontroller 430 provides power to a relay 432, which switches the air compressor on an off by either connecting or disconnecting the 120-volt AC circuit. When the AC circuit is connected, power is provided to the air compressor 402 to power the air powered pump(s) 404. When the AC circuit is disconnected, power is not provided to the air compressor 402 and the air powered pump(s) 404 are turned off. Either the microcontroller 430 or another processor or controller (not shown) can modify which and/or the ratio of the water, chemical(s), surfactant and/or enzymes that are supplied by the input line(s) 406 to the air powered pump(s) 404 in order to change the type of foam or spray delivered the heat exchangers.

Figure 5:
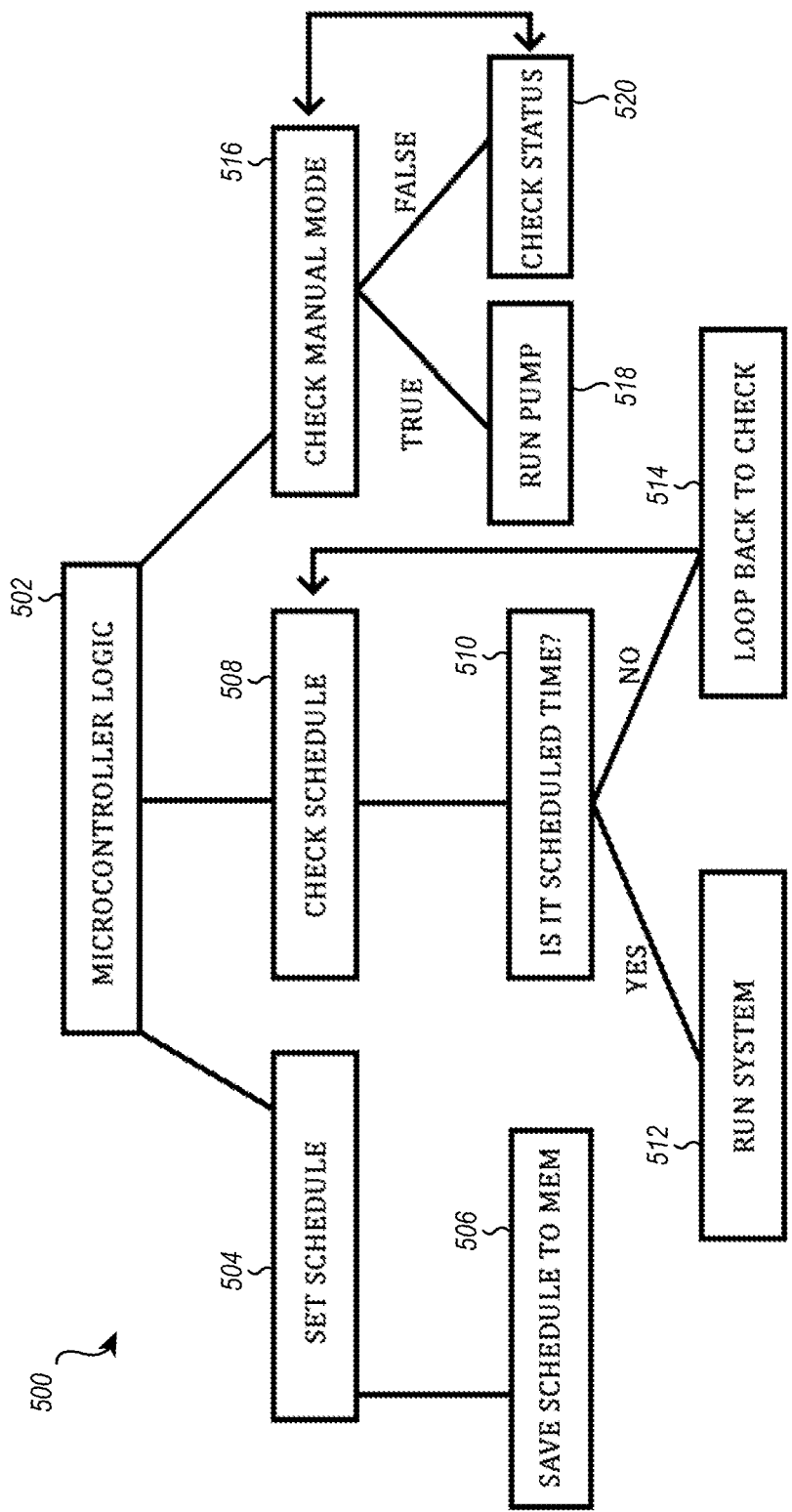
FIG. 5 is a decision tree that schematically illustrates an example controller system for automatically controlling the cleaning foam or maintenance spray generating system and the cleaning or maintenance schedule.

FIG. 5 is a decision tree 500 that schematically illustrates an example program for operating the foam or spray generation and delivery system 400 or any other system disclosed herein and/or that can be adapted from this disclosure. A microcontroller logic module 502 can be programmed to set a schedule 504, which can be saved to a memory module 506. The microcontroller logic module 502 can check the schedule 508 and determine whether a schedule time 510 has arisen. If yes, then the microcontroller logic module 502 can run the system 512. If not, then it can loop back to check later 514. The microcontroller logic module 502 can also check manual mode 516 and, if true, then the microcontroller logic module 502 can run a pump 518. If false, then the microcontroller logic module 502 can check the status 520 of the system to determine e.g., whether to operate automatically or manually.

Figure 6:
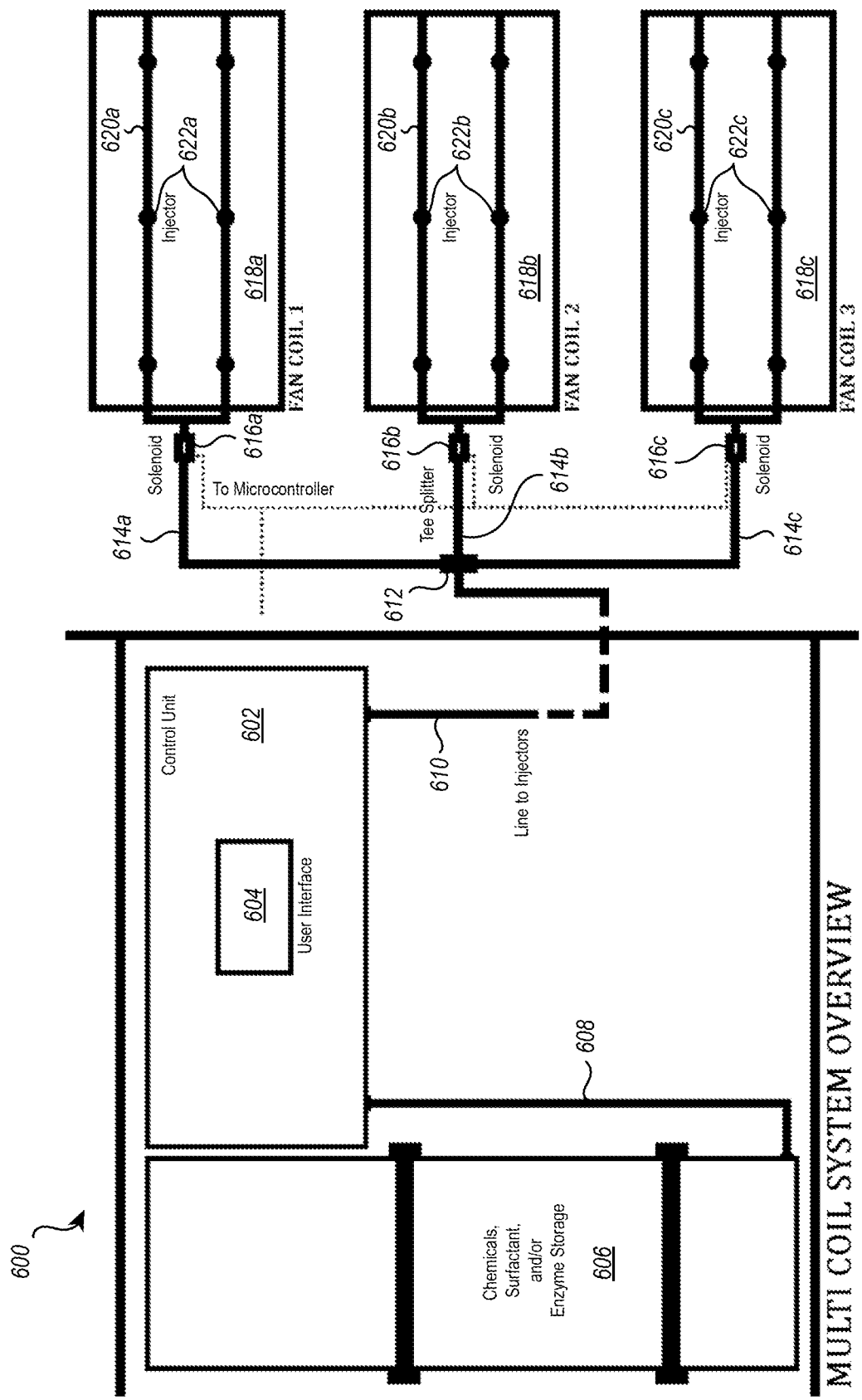
FIG. 6 is a diagram that schematically illustrates an example system for generating cleaning foam or maintenance spray and delivering it to multiple HVAC heat transfer coils.

FIG. 6 is a diagram that schematically illustrates an example foam or spray generation and delivery system 600 for automatically generating cleaning foam or maintenance spray and delivering it to a plurality of heat transfer coils (e.g., three, labeled as Fan Coil 1, Fan Coil 2, and Fan Coil 3). The generation and delivery system 600 includes a control unit 602, which can be a computerized system with a user interface 604, processor (not shown), and main memory (not shown). The control unit 602 can incorporate a pump and other apparatus illustrated in FIG. 4 as desired. As in FIG. 4, the control unit can include an air compressor, pump(s), power inputs, and the like.

The control unit 602 is configured to receive desired inputs, such as water and one or more of chemical(s), surfactant or enzymes from one or more storage tanks 606 via input line(s) 608. Water can be supplied by a water input line (not shown). The control unit 602 combines water, and one or more of chemical(s), surfactant or enzymes to produce a desired foam or spray mixture that will be delivered to coil injectors by means of a main delivery line 610. A distribution unit or tee splitter 612 receives the foam or spray mixture from the main delivery line 610 and delivers it via split delivery lines 614a, 614b, 614c to one or more of the coils in a desired sequence. A microcontroller (not shown) selectively operates solenoids 616a, 616b, 616c, which selectively open and close an associated solenoid valve to deliver foam or spray to a front surface of a selected heat transfer coil 618a, 618b, 618c. The foam or spray can be delivered via one or more sub-delivery lines 620a, 602b, 620c, which then distribute foam or spray across the front surface of a selected heat transfer coil 618a, 618b, 618c via injectors 622a, 622b, 622c. The order, duration and type of foam or spray delivered to the heat transfer coils 618a, 618b, 618c can be programmed into the control unit 602 and controlled by input via the user interface 604.

Figure 7:
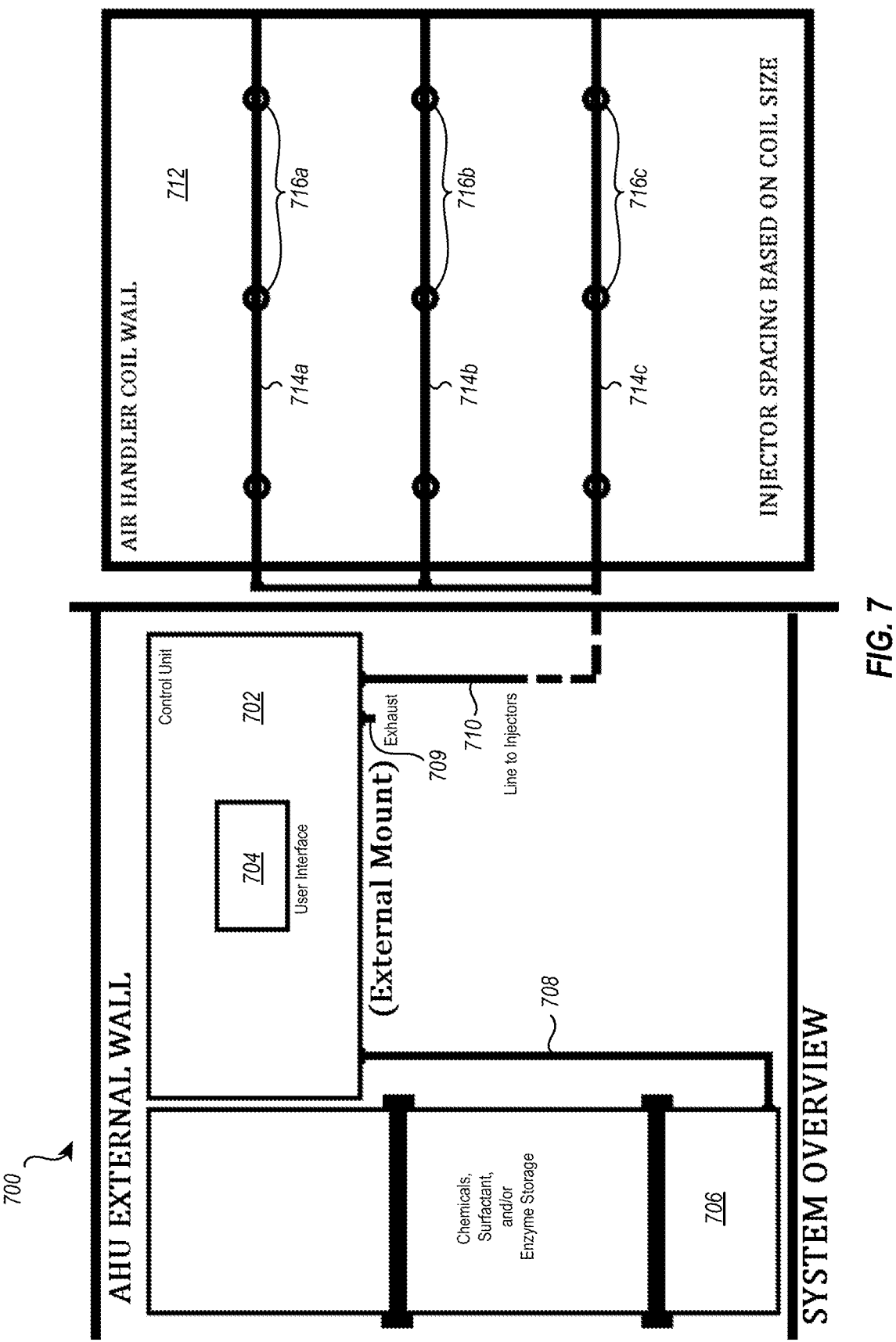
FIG. 7 is a diagram that schematically illustrates an example system for generating cleaning foam or maintenance spray and delivering it to an air handler coil wall of an HVAC system.

FIG. 7 is a diagram that schematically illustrates an example foam or spray generation and delivery system 700 for automatically generating cleaning foam or maintenance spray and delivering it to an air handler/coil wall 712. The generation and delivery system 700 includes a control unit 702, which can be a computerized system with a user interface 704, processor (not shown), and main memory (not shown). The control unit 702 can incorporate a pump and other apparatus illustrated in FIG. 4 as desired. As in FIG. 4, the control unit can include an air compressor, pump(s), power inputs, and the like.

The control unit 702 is configured to receive desired inputs, such as water and one or more of chemical(s), surfactant or enzymes from one or more storage tanks 706 via input line(s) 708. Water can be supplied by a water input line (not shown). The control unit 702 combines water, and one or more of chemical(s), surfactant or enzymes to produce a desired foam or spray mixture that will be delivered to coil injectors by means of a main delivery line 710. A distribution unit or tee splitter receives the foam or spray mixture from the main delivery line 710 and delivers it via sub-delivery lines 714a, 714b, 714c to the air handler/coil wall 712, which distribute foam or spray across the front surface of the heat transfer coil 712 via injectors 716a, 716b, 716c. The duration and type of foam or spray delivered to the heat transfer coil 712 can be programmed into the control unit 702 and controlled by input via the user interface 704.

Figure 8:
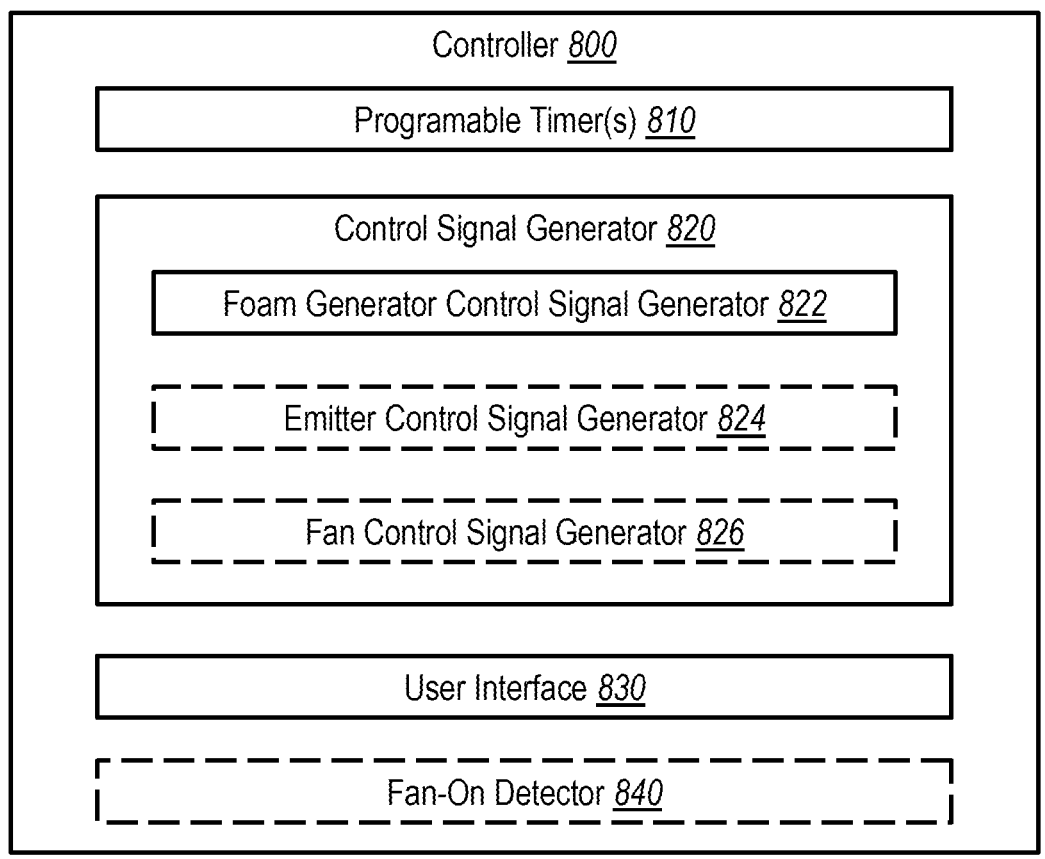
FIG. 8 is a box diagram that schematically illustrates an example architecture of a controller configured to control the cleaning and maintenance apparatus of FIGS. 1A-1C, 2, and/or 3A-3B.

FIG. 8 is a diagram that illustrates an example architecture of a controller 800, which can be used for any of controllers 120, 159, 176, 340, 602, 702 in FIGS. 1A-1C, 3A-3B, 6 and 7. The controller 800 includes one or more programmable timers 810, a control signal generator 820, and a user interface 830. The user interface 830 is configured to receive a user input to set the one or more programmable timers 810. The control signal generator 820 includes a foam or spray generator control signal generator 822 configured to generate a first control signal to turn on or off a foam or spray generator 110, 150, 170, 350, 400, 600, 700 in FIGS. 1A-1C, 3A-3B, 4, 6 and 7 based on the one or more programmable timers 810 set by the user input.

In some embodiments, such as those illustrated in FIGS. 1A-1C, FIGS. 3A-3B, 6 and 7, each of the one or more emitters 116, 146, 166, 332, 622, 716 can include a valve and an electric actuator configured to turn on or off the valve based on a second control signal, such that the one or more emitters are turned on or off based on the second control signal. The control signal generator 820 further includes an emitter control signal generator 824 configured to generate the second control signal to turn on or off any combination or subset of the emitter(s) 116, 146, 166, 332, 622, 716.

In some embodiments, the controller 800 also includes a fan-on detector 840 configured to detect whether the air handler or auxiliary fan (e.g., fan 140 illustrated in FIG. 1D) is running and/or what is the speed of the air handler or auxiliary fan. In response to determining that the air handler or auxiliary fan is running and/or the speed of the air handler or auxiliary fan if running, the control signal generator 820 then generates the first control signal to turn on the foam or spray generator 110, 150, 170, 350, 400, 600, 700 and/or the second control signal to turn on the emitters 116, 146, 166, 332, 622, 716.

In some embodiments, the control signal generator 820 further includes a fan control signal generator 826 configured to generate a third control signal to turn on the air handler or auxiliary fan. In response to determining that the air handler or auxiliary fan is not on, the fan control signal generator 826 generates the third control signal to turn on the air handler or auxiliary fan before generating the first control signal to turn on the foam or spray generator 110, 150, 170, 350, 400, 600, 700 in FIGS. 1A-1C, 3A-3B, 4, 6 and 7 and/or the second control signal to turn on the emitters 116, 146, 166, 332, 622, 716.

Figure 9:
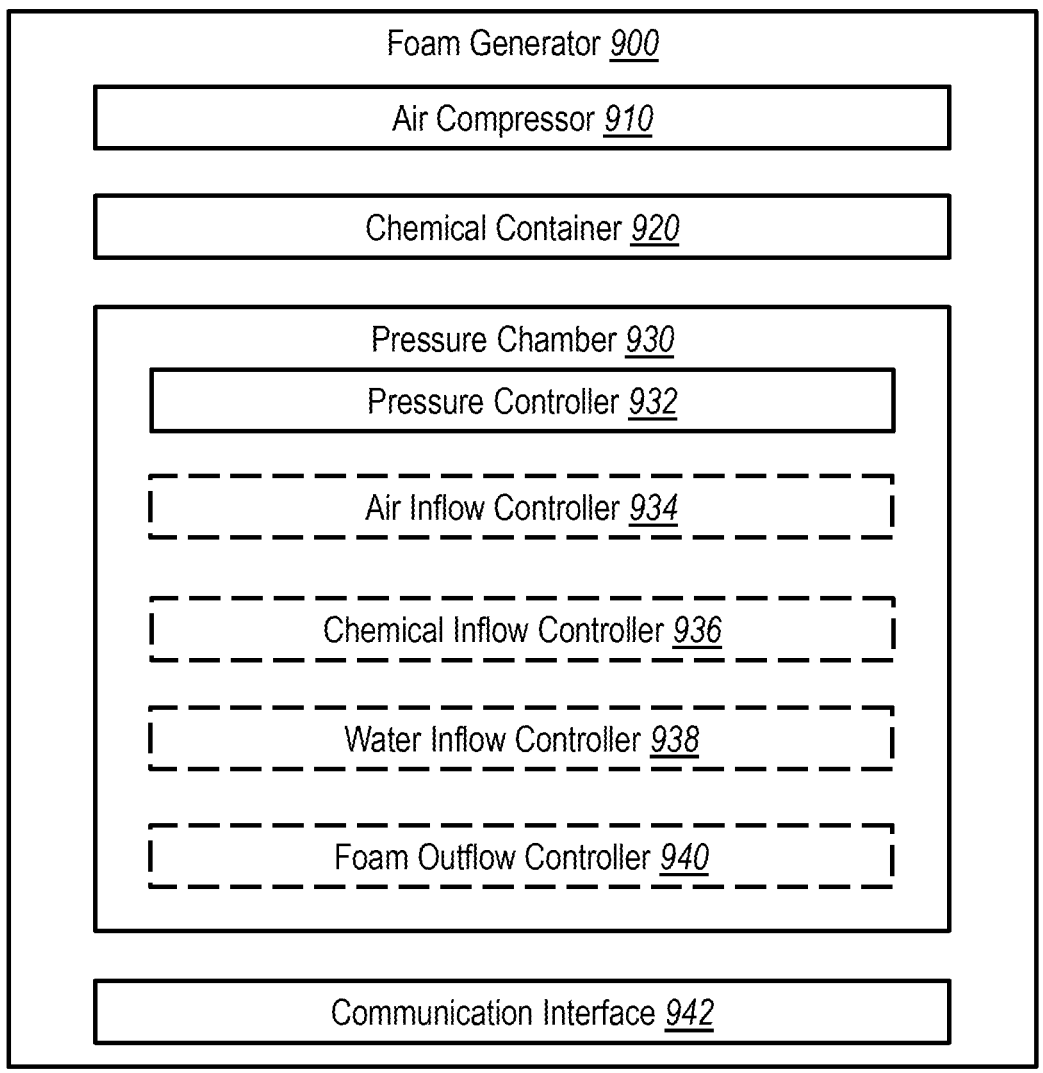
FIG. 9 is a box diagram that schematically illustrates an example architecture of a foam or spray generator of FIGS. 1A-1C, 2, and/or 3A-3B.

FIG. 9 illustrates an example architecture of a foam or spray generator 900, which corresponds to the foam or spray generator 110, 150, 170, 350, 400, 600, 700 in FIGS. 1A-1C, 3A-3B, 4, 6 and 7. The foam or spray generator 900 includes an air compressor 910, a chemical container 920, and a pressure chamber 930. The air compressor 910 is configured to generate pressurized air. The chemical container 920 is configured to contain one or more cleaning chemicals, such as (but not limited to) surfactants. In some embodiments, the chemical container 920 is configured to hold one or more solid compounds. In some embodiments, the chemical container 920 is configured to hold one or more liquid solutions, which can be pumped into a pressure chamber 930 by an air pump (which may or may not be a part of the air compressor 910).

The pressure chamber 930 includes (1) one or more chemical input ports configured to receive the one or more chemicals, (2) an air input port configured to receive the pressurized air, and (3) a water input port configured to receive water. A mixture of the chemical(s), the pressurized air, and the water are configured to form a desired foam or spray. The pressure chamber 930 also includes one or more outflow ports configured to output the foam or spray into the manifold(s) 112, 144, 164, 330, 620, 714 illustrated in FIGS. 1A-1C, 3A-3B, 6 and 7.

In some embodiments, the pressure chamber 930 further includes a pressure controller 932 configured to control a pressure therein. In some embodiments, the pressure chamber 930 further includes an air inflow controller 934 configured to control an inflow of the pressurized air. In some embodiments, the pressure chamber 930 further includes a chemical inflow controller 936 configured to control an inflow of the one or more chemicals. In some embodiments, the pressure chamber 930 further includes a water inflow controller 938 configured to control an inflow of the water. Altering the ratio of input components (e.g., the chemical(s), the air, and/or the water) yields different types of cleaning foam or spray, such as thicker foam, thinner foam, richer foam, diluted foam, adherent foam, runny foam, liquid spray, and the like, depending on the needs of the cleaning. In some embodiments, the pressure chamber 930 further includes a foam or spray outflow controller 940 configured to control an outflow of the foam or spray.

The foam or spray generator 900 also includes a communication interface 942 configured to communicate with the controller 800 (FIG. 8). The communication interface 942 may include a wired and/or a wireless interface. In some embodiments, the wireless interface is configured to communicate with a mobile device, and a mobile application installed on the mobile device serves as a controller 800.

The following discussion now refers to a number of methods and method acts or steps that may be performed. Although the method acts or steps may be discussed in a certain order or illustrated in a flow chart as occurring in a particular order, no particular ordering is required unless specifically stated, or required because an act is dependent on another act being completed prior to the act or step being performed.

Figure 10:
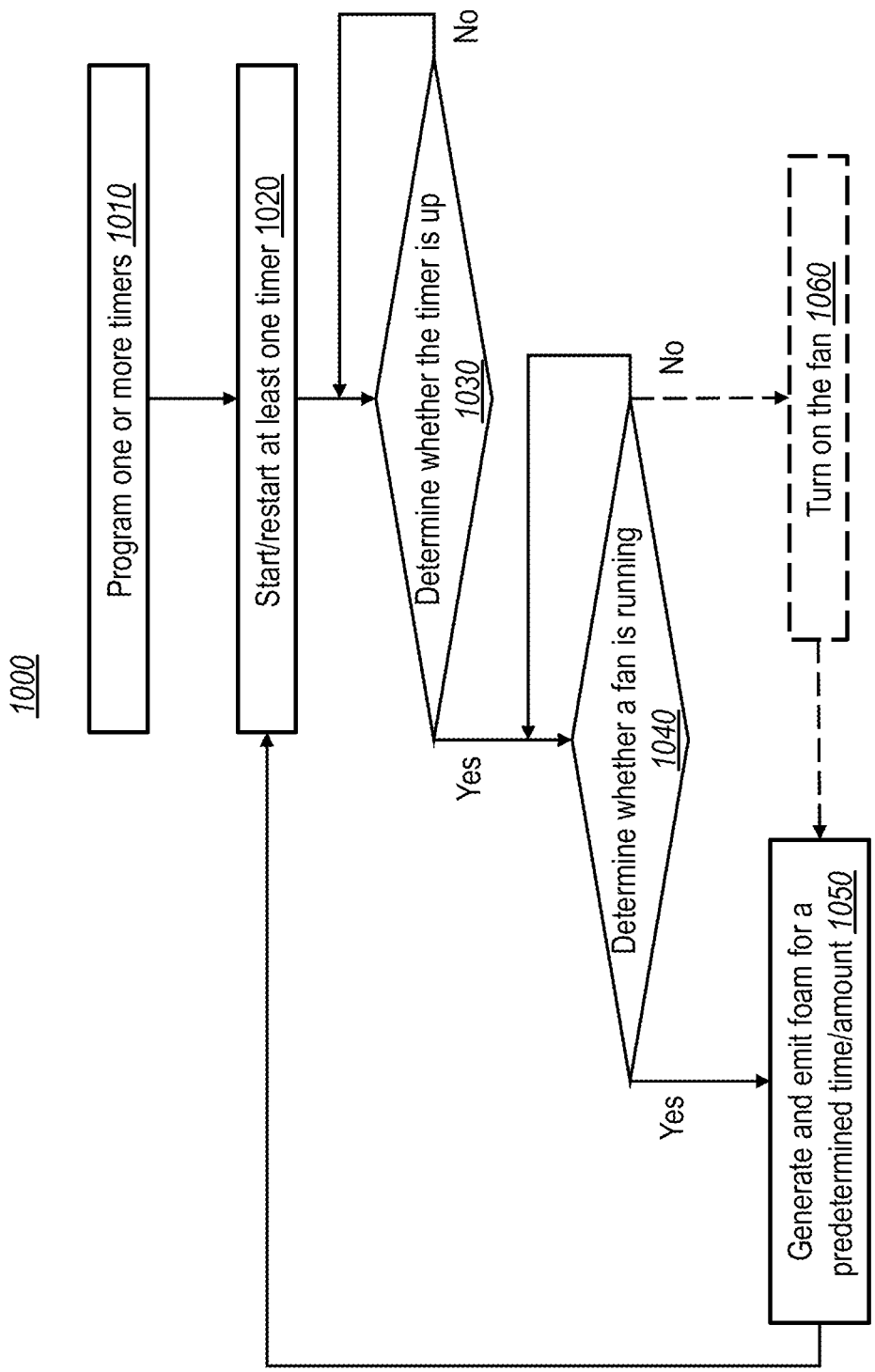
FIG. 10 is a flowchart that schematically illustrates an example method for automatically cleaning and maintaining a heat transfer coil of an HVAC system.

FIG. 10 illustrates a flowchart of an example method 1000 that may be implemented at a controller (e.g., 800) for controlling a self-cleaning and maintaining HVAC system having a fan and heat transfer coil (e.g., a condenser coil and/or an evaporator coil). The fan is configured to cause air to flow into a front side of the heat transfer coil and flow out of a back side of the heat transfer coil. The method 1000 includes an act or step 1010 of programming one or more programmable timers and an act or step 1020 of starting at least one of the one or more timers. In response to performing an act or step 1030 of determining that the at least one timer is up, an act or step 1040 is then performed to determine whether the fan is running. In response to the act or step 1040 of determining that the fan is running, the controller causes a foam or spray generator to generate foam or spray, and/or causes one or more emitters to emit the foam or spray onto the front side of the heat transfer coil for a predetermined time or a predetermined amount (act or step 1050). In some embodiments, in response to determining that the fan is not running, the controller waits until the fan is turned on, then causes the foam or spray generator to generate foam or spray and/or cause the one or more emitters to emit the foam or spray for a predetermined time or a predetermined amount. In some embodiments, in response to determining that the fan is not running, the controller automatically turns the fan on (act or step 1060). As such, the foam or spray is caused to flow through the condenser coil by the airflow generated by the fan. In some cases, movement of air through the coil causes a liquid spray or thin foam to become volumized into more aerated foam.

In some embodiments, different timers are set for emitting different types of foam or spray. For example, a first timer may be set for emitting thick cleaning foam for a first period (e.g., an hour) at a first frequency (e.g., quarterly, semi-annually, or annually), and a second timer may be set for emitting a mist or fog containing enzymes and/or disinfectant for a second period (e.g., one minute) at a second frequency (e.g., daily, weekly, or monthly). In some embodiments, a sequence of operations is programmed to be performed sequentially. In some embodiments, different types of foam or spray are sequentially emitted one after another. For example, thick cleaning foam may first be emitted for a first period of time (e.g. an hour); after that, thin cleaning foam may then be emitted for a second period of time (e.g., half an hour); and after that, a mist containing enzymes or disinfectant (or deodorizer) may then be emitted for a third period of time (e.g., a few minutes).

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Furthermore, although the foregoing has been described in some detail by way of illustrations and examples for purposes of clarity and understanding, it will be understood by those of skill in the art that numerous and various modifications can be made without departing from the spirit of the present disclosure. Therefore, it should be clearly understood that the forms disclosed herein are illustrative only and are not intended to limit the scope of the present disclosure, but rather to also cover all modifications and alternatives coming with the true scope and spirit of the invention.

The invention claimed is:

1. A cleaning apparatus for self-cleaning and maintaining a heat transfer coil of an HVAC system having an air handler fan that causes air to enter a front side of the heat transfer coil and exit a back side of the heat transfer coil during normal operation of the HVAC system, comprising:
a foam or spray generator configured to generate foam or spray;
one or more manifolds configured to receive the foam or spray generated by the foam or spray generator, each of the one or more manifolds including one or more emitters configured to emit the foam or spray onto the front side of the heat transfer coil where air is caused to enter when the air handler fan of the HVAC system is running during normal operation of the HVAC system;
one or more couplers configured to couple the one or more manifolds onto the heat transfer coil of the HVAC system, such that the one or more emitters are configured to emit the foam or spray onto the front side of the heat transfer coil; and
a controller configured to cause the foam or spray generator to generate the foam or spray and cause the one or more emitters to emit the foam or spray onto the front side of the heat transfer coil when the air handler fan of the HVAC system is running and causing air to flow in the same direction as it flows during normal operation of the HVAC system, such that the foam or spray is caused to flow into the front side of the heat transfer coil, flow through the heat transfer coil to dislodge and remove microbes, dirt, or debris from small spaces and surfaces inside the heat transfer coil, and flow out the back side of the heat transfer coil together with the microbes, dirt, or debris removed from the small spaces and surfaces inside the heat transfer coil.

2. The cleaning apparatus of claim 1, wherein:
the one or more manifolds includes a plurality of manifolds positioned adjacent to the front side of the heat transfer coil, each of which includes an input port, and
the foam or spray generator includes a plurality of output ports, each of which is connected to an input port of one of the plurality of manifolds.

3. The cleaning apparatus of claim 1, wherein the one or more manifolds are movably coupled to the heat transfer coil and configured to move across the front side of the heat transfer coil.

4. The cleaning apparatus of claim 1, wherein the controller comprises:
one or more programmable timers;
a user interface configured to receive a user input to set the one or more programmable timers; and
a control signal generator configured to generate a control signal to turn on or off the foam or spray generator based on the one or more programmable timers set by the user input,
wherein the controller is configured to turn on the foam or spray generator when the air handler of the HVAC system is running.

5. The cleaning apparatus of claim 4, wherein:
each of the one or more emitters includes a valve and an electric actuator configured to turn on or off the valve based on a second control signal, such that the one or more emitters are turned on or off based on the second control signal, and
the control signal generator is further configured to generate the second control signal to turn on or off the one or more emitters,
wherein the second control signal turns on the foam or spray generator when the air handler of the HVAC system is running.

6. The cleaning apparatus of claim 4, wherein the controller is further configured to:
detect whether the air handler of the HVAC system is running; and
in response to determining that the air handler of the HVAC system is running, generate the control signal to turn on the foam or spray generator.

7. The cleaning apparatus of claim 4, wherein the controller is further configured to:
in response to determining that the air handler of the HVAC system is not running, generate a third control signal to turn on the air handler of the HVAC system before generating the control signal to turn on the foam or spray generator.

8. The cleaning apparatus of claim 1, wherein the foam or spray generator comprises: an air compressor and a pressure chamber, the pressure chamber comprising:
a chemical input port configured to receive one or more chemicals;
optionally an air input port configured to receive pressurized air from the air compressor;
a water input port configured to receive water;
a pressure controller configured to control a pressure in the pressure chamber, causing a pressurized mixture of the one or more chemicals, optional air, and water to form the foam or spray;
one or more output ports configured to output the foam or spray; and
a communication interface configured to communicate with the controller.

9. The cleaning apparatus of claim 8, wherein the pressure chamber further comprises:
optionally an air inflow controller configured to control an inflow of the pressurized air;
a chemical inflow controller configured to control an inflow of the one or more chemicals;
a water inflow controller configured to control an inflow of the water; and
an outflow controller configured to control an outflow of the foam or spray.

10. The cleaning apparatus of claim 8, wherein the controller is further configured to generate a control signal to control at least one of (1) a pressure of the pressure chamber, (2) an air inflow of the pressure chamber, (3) a chemical inflow of the pressure chamber, (4) a water inflow of the pressure chamber, or (5) a foam or spray outflow of the pressure chamber.

11. A self-cleaning HVAC system, comprising:
a heat transfer coil configured to disperse heat, the heat transfer coil having a first side where warm air enters and a second side where cooled air exits during normal operation of the HVAC system;
a fan configured to cause warm air to flow into the first side of the heat transfer coil and cooled air to flow out of the second side of the heat transfer coil during normal operation of the HVAC system;
a foam or spray generator configured to generate foam or spray comprising water, enzymes, and optionally one or more of surfactant, detergent, chlorine, chlorine dioxide, hydrogen peroxide, antimicrobial, or fragrance;

one or more manifolds configured to receive the foam or spray generated by the foam or spray generator, each of the one or more manifolds including one or more emitters configured to emit the foam or spray;

one or more couplers configured to couple the one or more manifolds onto the heat transfer coil, such that the one or more emitters are configured to emit the foam or spray onto the first side of the heat transfer coil; and a controller configured to cause the foam or spray generator to generate the foam or spray and cause the one or more emitters to emit the foam or spray onto the first side of the heat transfer coil when the fan of the HVAC system is running and causing air to flow in the same direction as it flows during normal operation of the HVAC system, such that the fan causes the foam or spray to flow through the heat transfer coil to dislodge and remove microbes, dirt, or debris from small spaces and surfaces inside the heat transfer coil, and flow out the second side of the heat transfer coil together with microbes, dirt, or debris removed from the small spaces and surfaces inside the heat transfer coil.

12. The self-cleaning HVAC system of claim 11, wherein:
the one or more manifolds includes a plurality of manifolds, each of which includes an input port, and
the foam or spray generator includes a plurality of output ports, each of which is connected to an input port of one of the plurality of manifolds.

13. The self-cleaning HVAC system of claim 11, wherein the one or more manifolds are movably coupled to the heat transfer coil and configured to move across the first side of the heat transfer coil and emit the foam or spray onto the first side of the heat transfer coil when the fan of the HVAC system is running.

14. The self-cleaning HVAC system of claim 11, wherein the controller comprises:
one or more programmable timers;
a user interface configured to receive a user input to set the one or more programmable timers; and
a control signal generator configured to generate a control signal to turn on or off the foam or spray generator based on the one or more programmable timers set by the user input,
wherein the controller is configured to turn on the foam or spray generator when the fan of the HVAC system is running.

15. The self-cleaning HVAC system of claim 14, wherein:
each of the one or more emitters includes a valve and an electric actuator configured to turn on or off the valve based on a second control signal, such that the one or more emitters are turned on or off, and
the control signal generator is further configured to generate the second control signal to turn on or off the one or more emitters,
wherein the second control signal turns on the foam or spray generator when the fan of the HVAC system is running.

16. The self-cleaning HVAC system of claim 14, wherein the controller is further configured to:
detect whether the fan of the HVAC system is running; and
in response to determining that the fan of the HVAC system is running, generate the control signal to turn on the foam or spray generator.

17. The self-cleaning HVAC system of claim 14, wherein the controller is further configured to:
turn on the fan of the HVAC system; and
in response to determining that the fan of the HVAC system is not on, turn the fan on before generating the control signal to turn on the foam or spray generator.

18. A self-cleaning HVAC system of comprising:
a heat transfer coil configured to disperse heat;
a fan configured to cause air to flow in from a first side of the heat transfer coil and flow out of a second side of the heat transfer coil;
a foam or spray generator configured to generate foam or spray;
one or more manifolds configured to receive the foam or spray generated by the foam generator, each of the one or more manifolds including one or more emitters configured to emit the foam or spray;
one or more couplers configured to couple the one or more manifolds onto the heat transfer coil, such that the one or more emitters are configured to emit the foam or spray onto the first side of the heat transfer coil; and
a controller configured to cause the foam generator to generate the foam or spray and cause the one or more emitters to emit the foam or spray when the fan is running, such that the fan causes the foam or spray to flow through the heat transfer coil to clean debris off the heat transfer coil,
wherein the foam or spray generator comprises: an air compressor and a pressure chamber, the pressure chamber comprising:
a chemical input port configured to receive one or more chemicals;
optionally an air input port configured to receive pressurized air from the air compressor;
a water input port configured to receive water;
a pressure controller configured to control a pressure in the pressure chamber, causing a pressurized mixture of the one or more chemicals, optional air, and water to form the foam or spray;
one or more output ports configured to output the foam or spray; and
a communication interface configured to communicate with the controller.

19. The self-cleaning HVAC system of claim 18, wherein the pressure chamber further comprises:
optionally an air inflow controller configured to control an inflow of the pressurized air;
a chemical inflow controller configured to control an inflow of the one or more chemicals;
a water inflow controller configured to control an inflow of the water; and
an outflow controller configured to control an outflow of the foam or spray.

20. The self-cleaning HVAC system of claim 18, wherein the controller is further configured to generate a control signal to control at least one of (1) a pressure of the pressure chamber, (2) an air inflow of the pressure chamber, (3) a chemical inflow of the pressure chamber, (4) a water inflow of the pressure chamber, or (5) a foam or spray outflow of the pressure chamber.

* * * * *